(12) United States Patent
Saito

(10) Patent No.: US 8,488,251 B2
(45) Date of Patent: Jul. 16, 2013

(54) ZOOM LENS AND IMAGE PICKUP APPARATUS INCLUDING THE ZOOM LENS

(75) Inventor: Shinichiro Saito, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 1 day.

(21) Appl. No.: 13/099,623

(22) Filed: May 3, 2011

(65) Prior Publication Data

US 2011/0317280 A1 Dec. 29, 2011

(30) Foreign Application Priority Data

Jun. 28, 2010 (JP) ................................. 2010-146109

(51) Int. Cl.
*G02B 15/14* (2006.01)
(52) U.S. Cl.
USPC .......................................... 359/683; 359/687
(58) Field of Classification Search
USPC .......................................... 359/683, 686, 687
See application file for complete search history.

(56) References Cited

U.S. PATENT DOCUMENTS

| | | | |
|---|---|---|---|
| 7,206,137 B2 | 4/2007 | Nakatani et al. | |
| 7,304,805 B2 | 12/2007 | Endo et al. | |
| 7,382,549 B2 | 6/2008 | Miyajima | |
| 2009/0040604 A1* | 2/2009 | Obu et al. | 359/432 |

FOREIGN PATENT DOCUMENTS

| | | |
|---|---|---|
| CN | 1700049 A | 11/2005 |
| CN | 101363955 A | 2/2009 |

* cited by examiner

*Primary Examiner* — William Choi
(74) *Attorney, Agent, or Firm* — Canon U.S.A., Inc. IP Division

(57) ABSTRACT

A zoom lens includes, in order from the object side to the image side, a first lens unit having a positive refractive power, a second lens unit having a negative refractive power, a third lens unit having a positive refractive power, and a rear lens group including one or more lens units. During zooming, the first lens unit moves along a locus convex towards the image side, and the second lens unit and the third lens unit move such that an interval between the first lens unit and the second lens unit becomes larger at a telephoto end than at a wide-angle end and an interval between the second lens unit and the third lens unit becomes smaller at the telephoto end than at the wide-angle end. The third lens unit includes a positive lens and a negative lens. Image forming magnifications $\beta 2W$ and $\beta 2T$ of the second lens unit at the wide-angle end and at the telephoto end, image forming magnifications $\beta 3W$ and $\beta 3T$ of the third lens unit at the wide-angle end and at the telephoto end, a focal length f2 of the second lens unit, and a focal length fT of the entire zoom lens at the telephoto end are appropriately set.

14 Claims, 26 Drawing Sheets

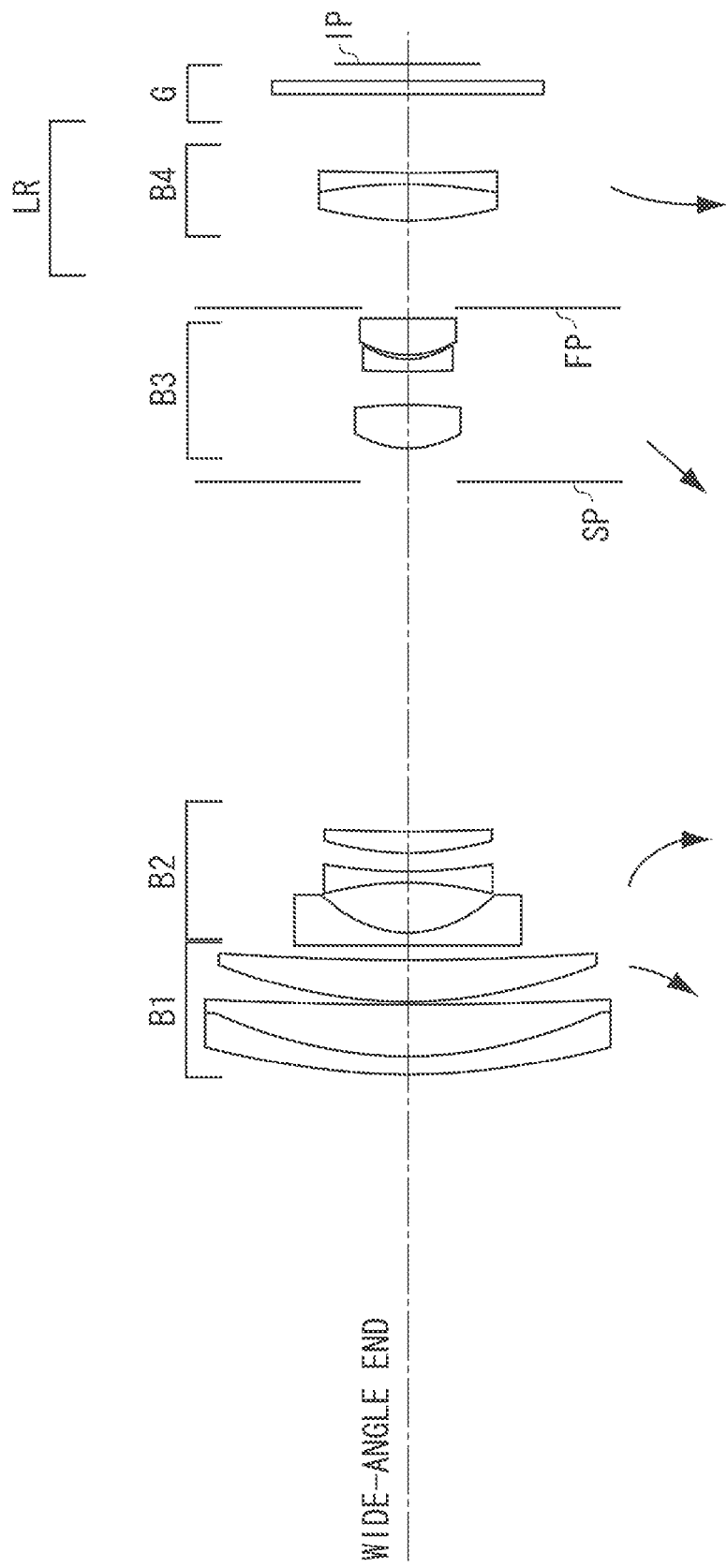

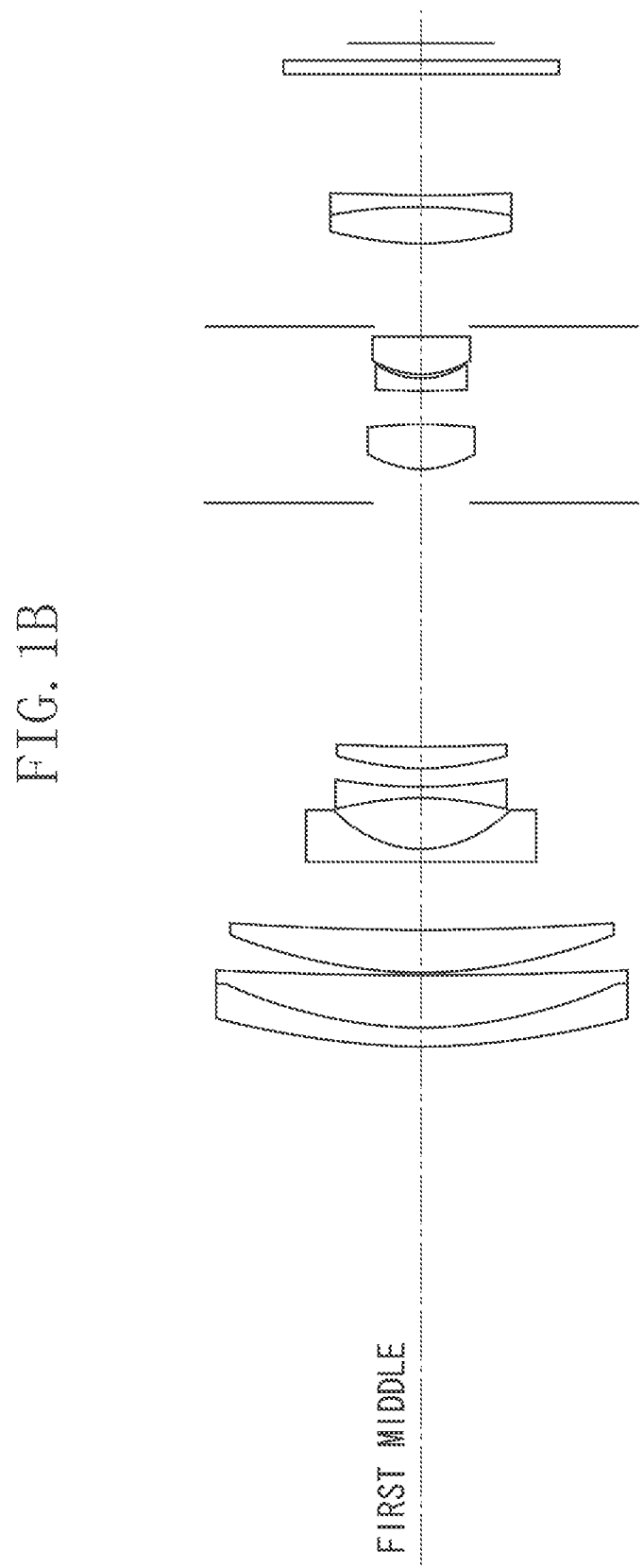

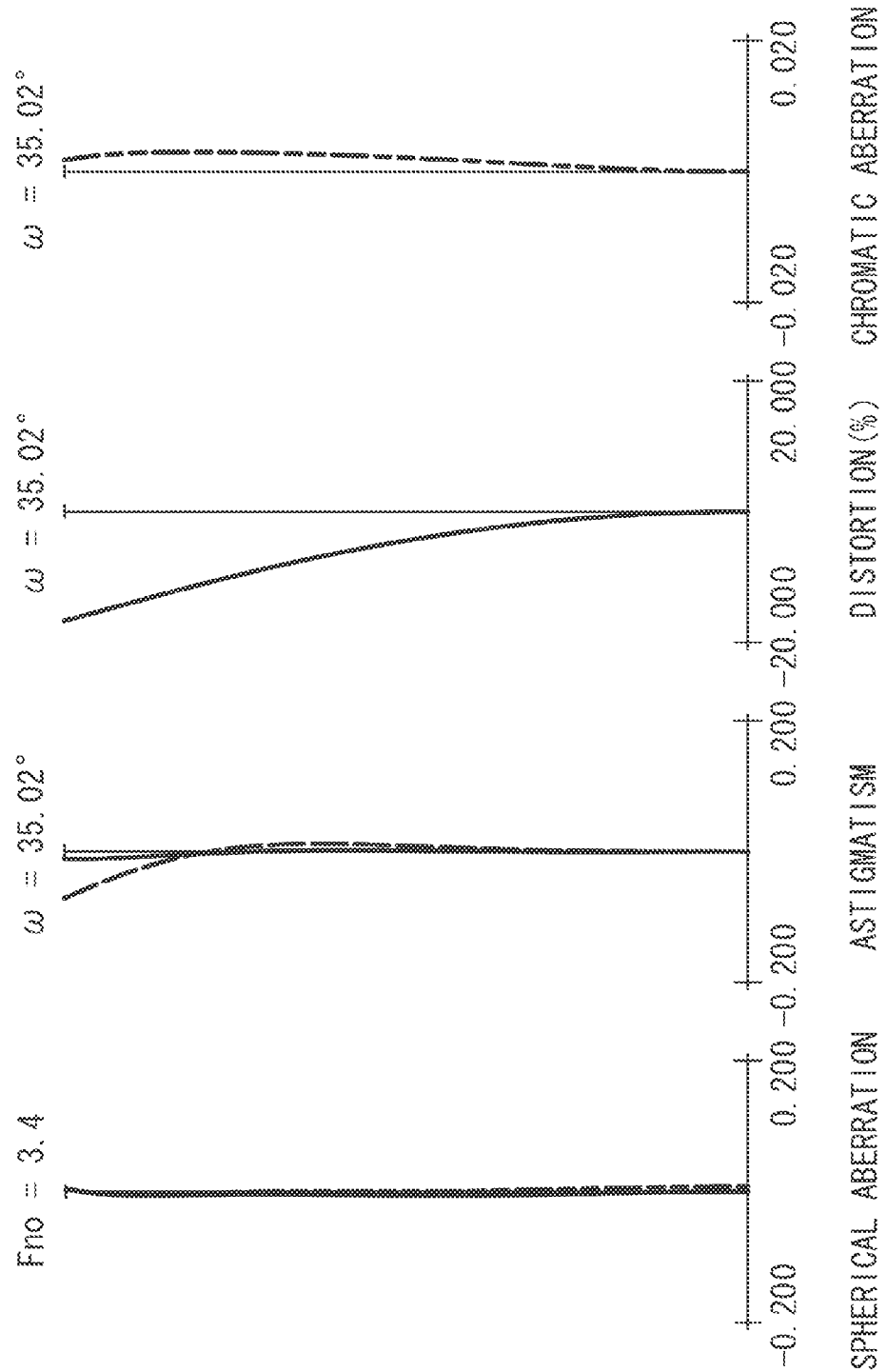

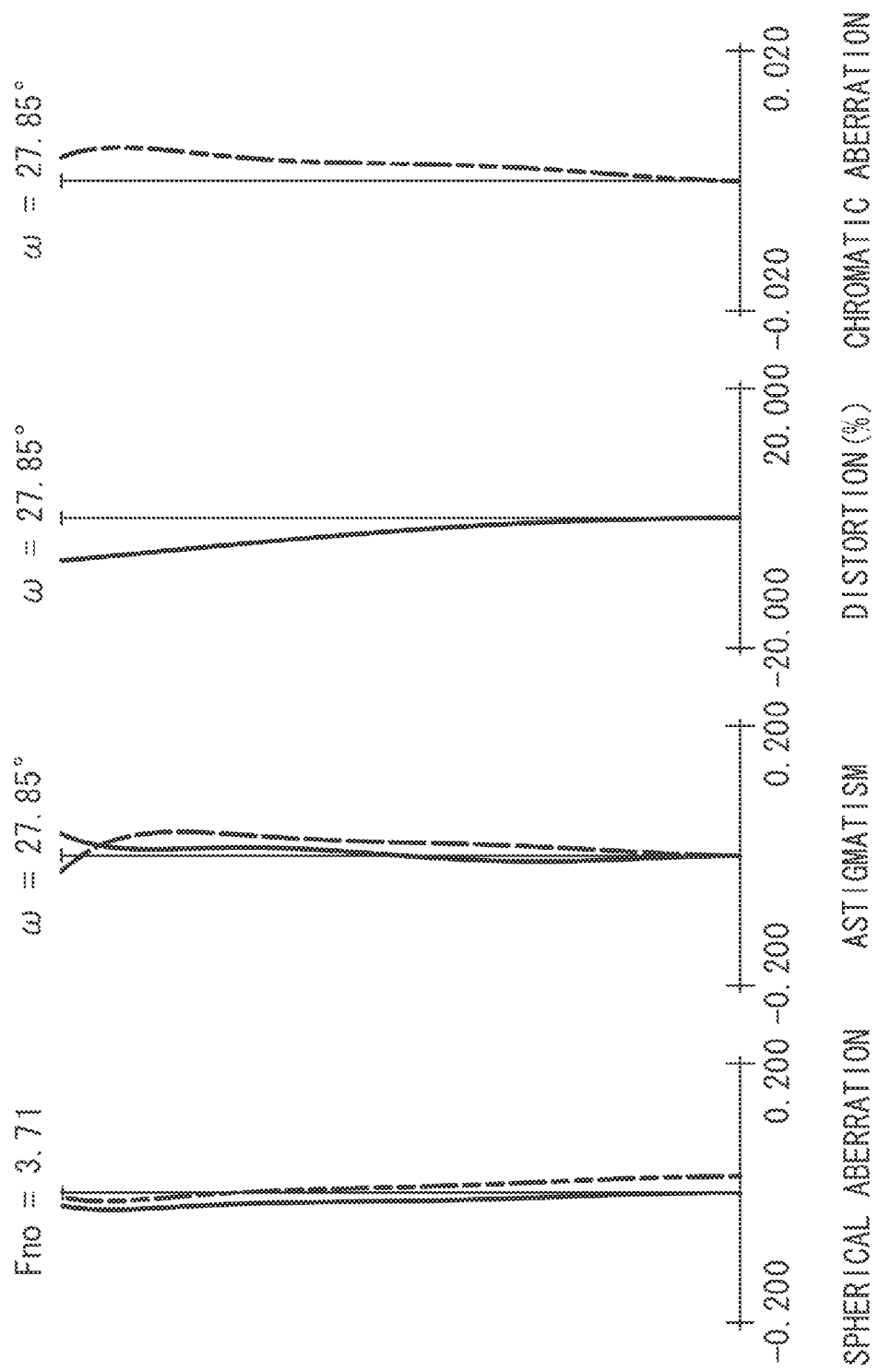

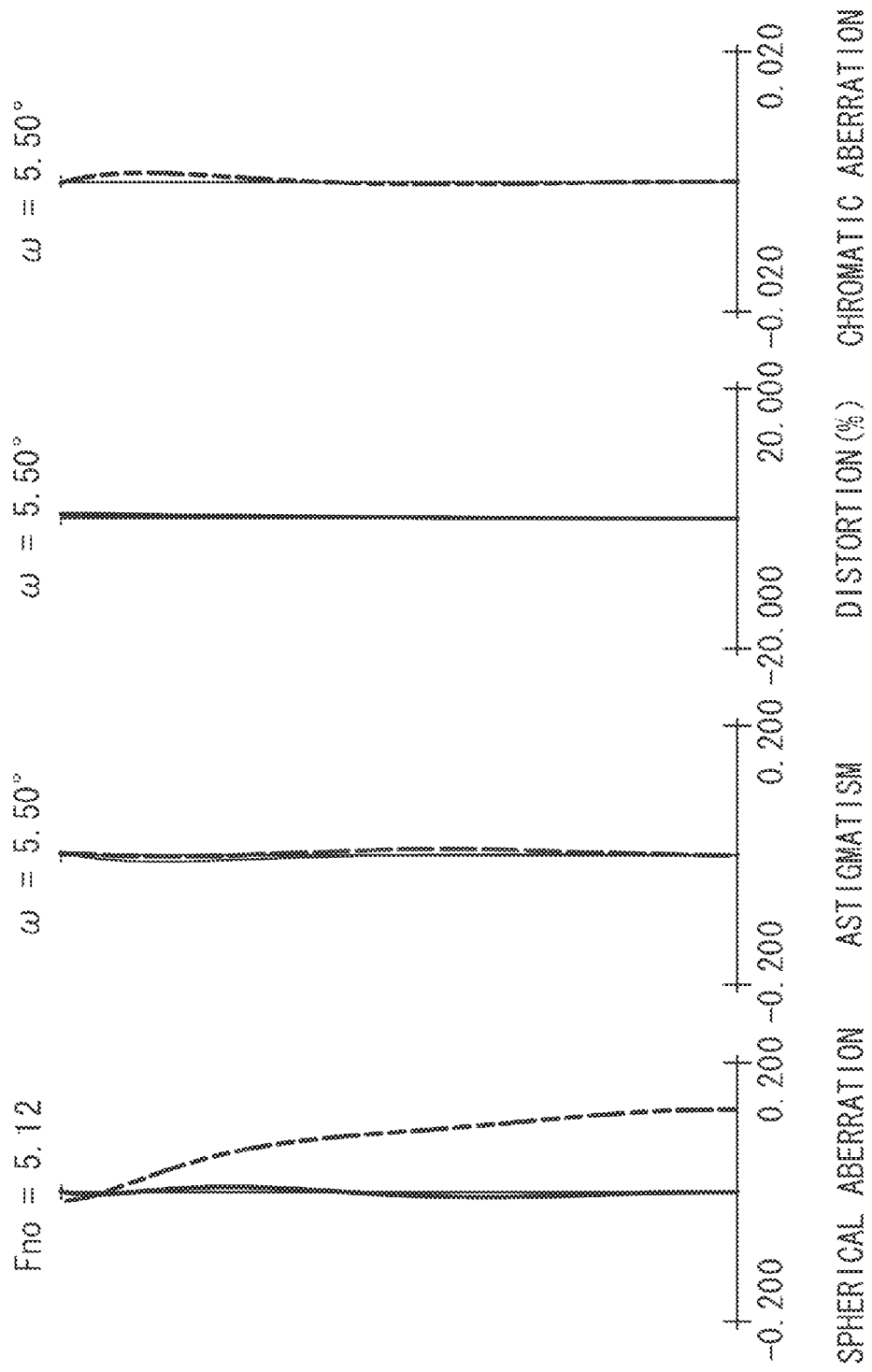

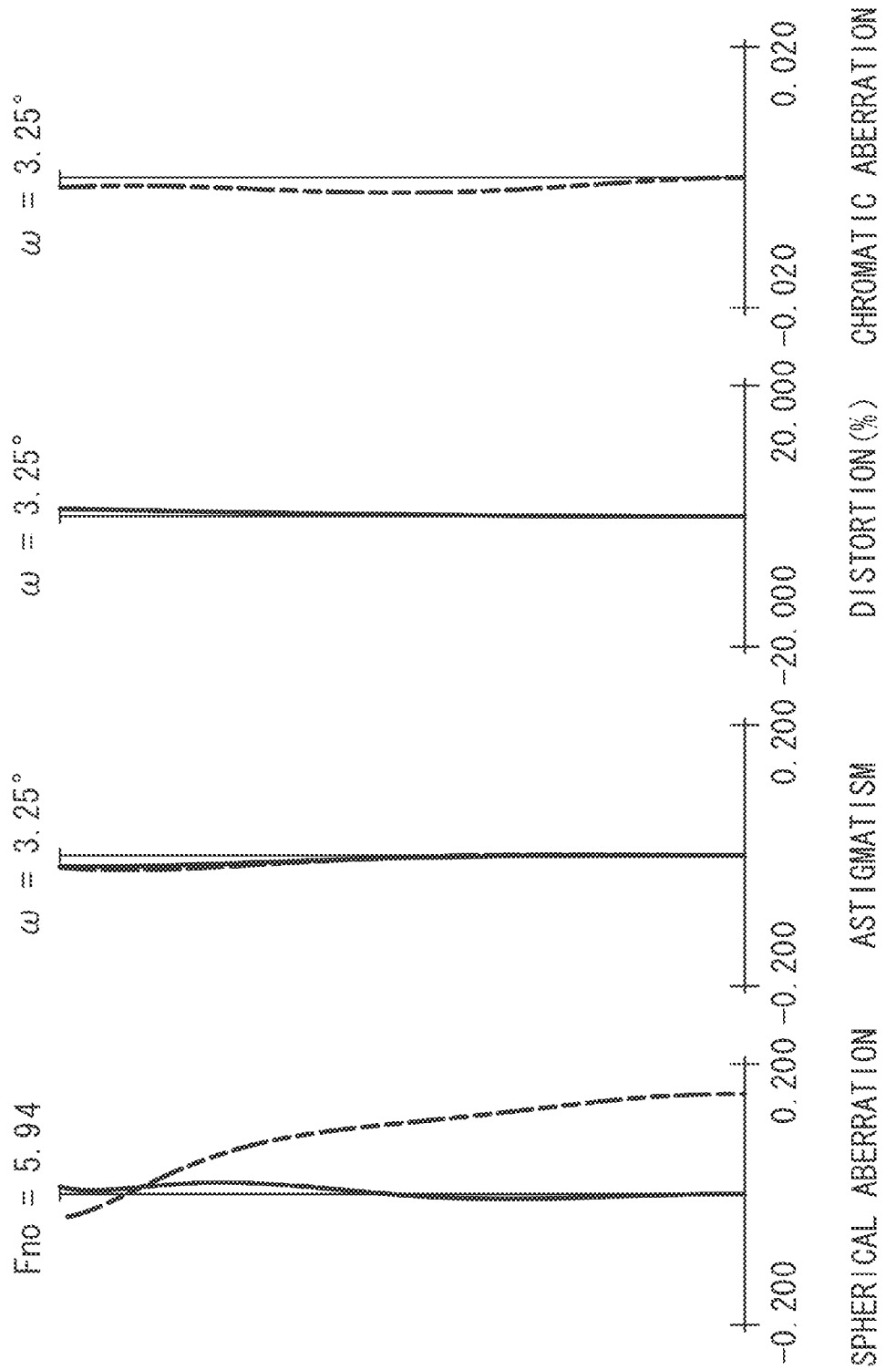

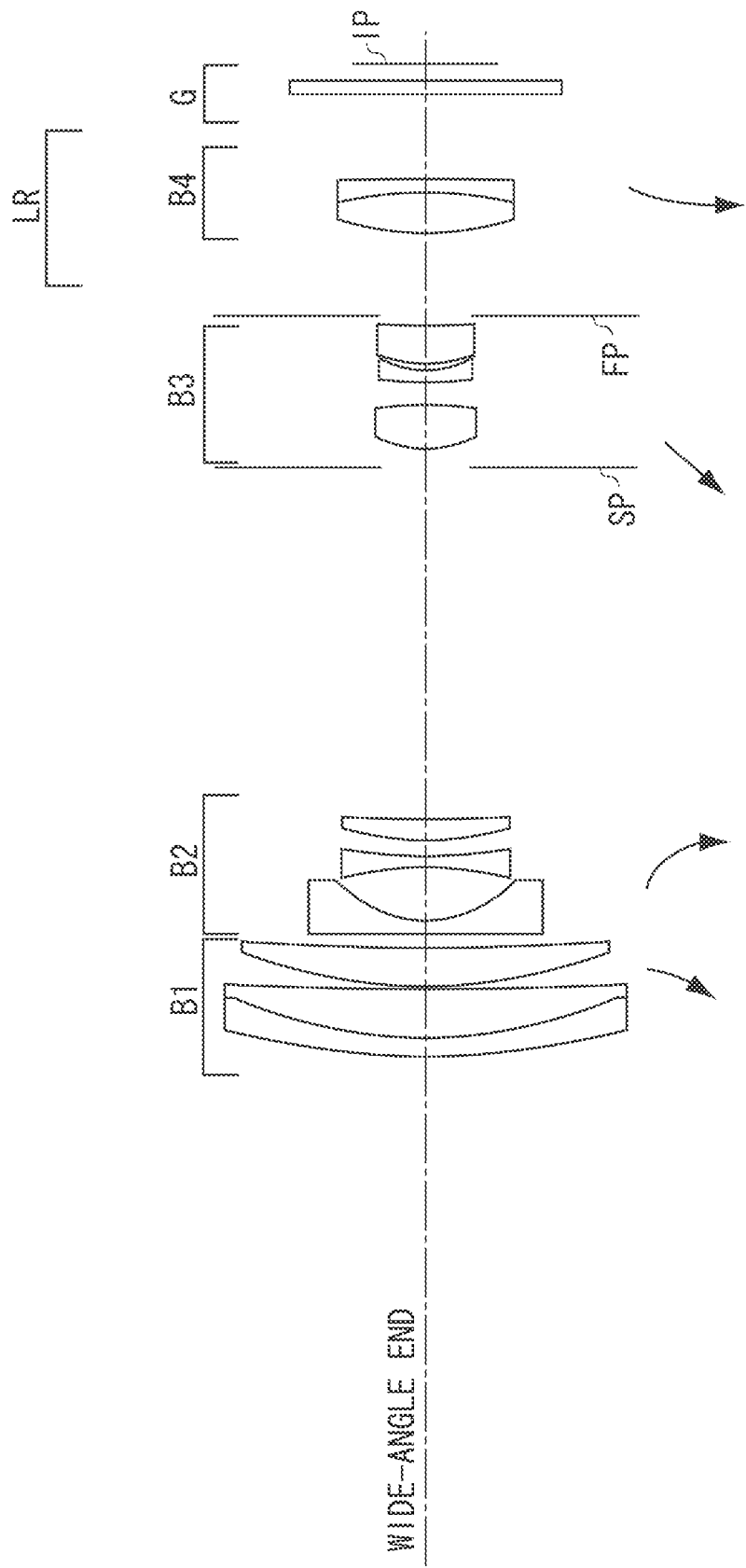

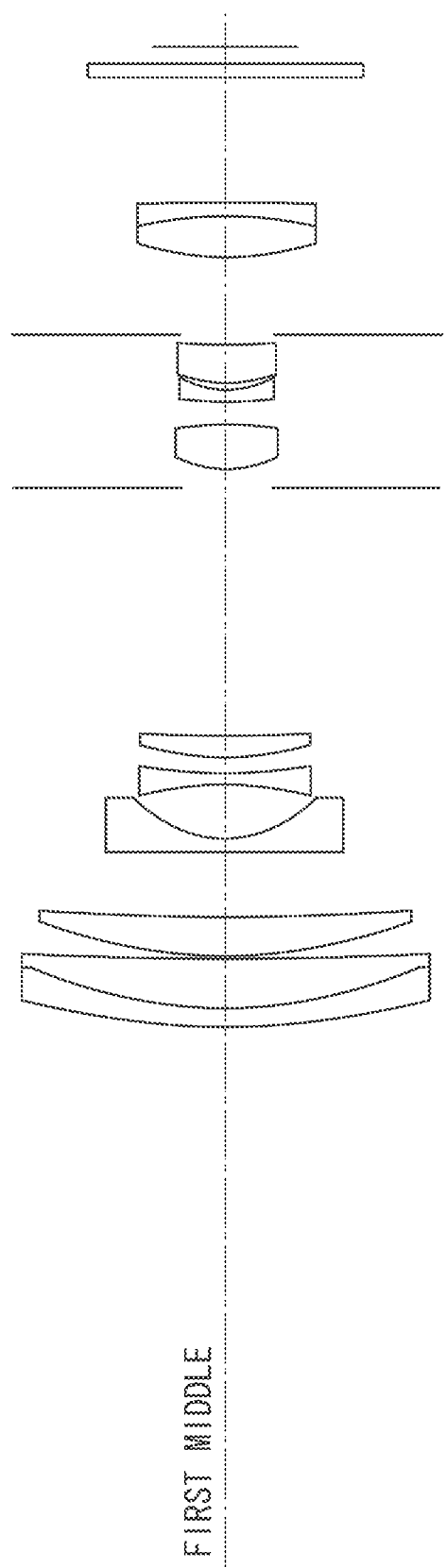

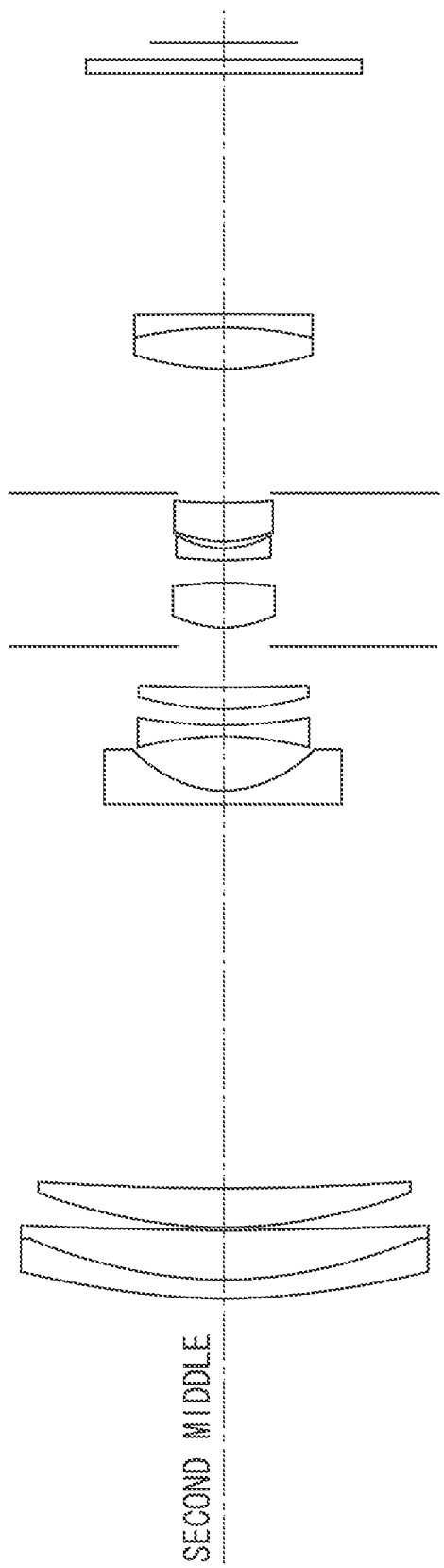

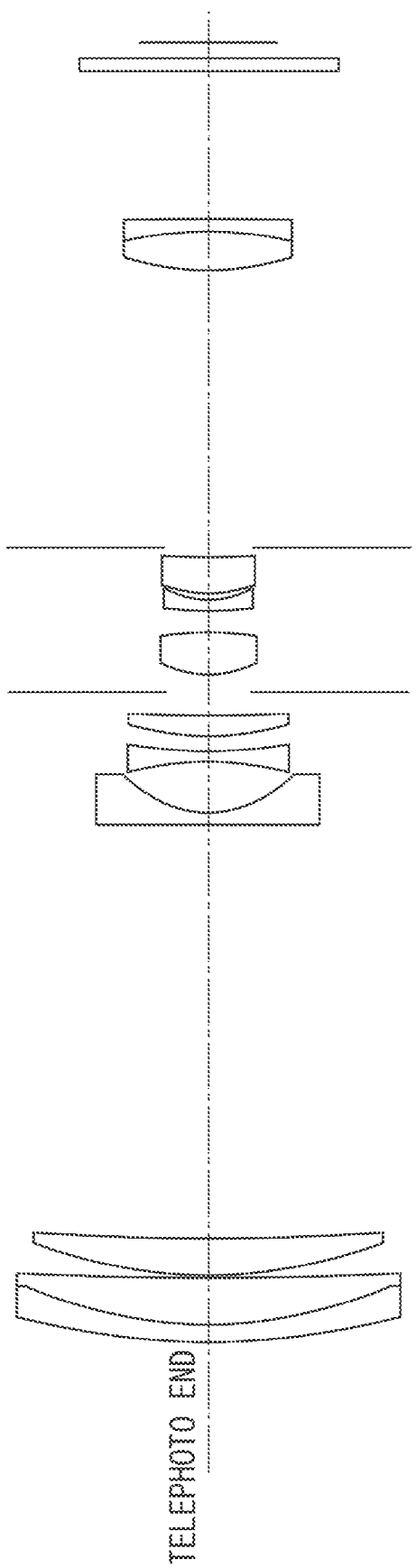

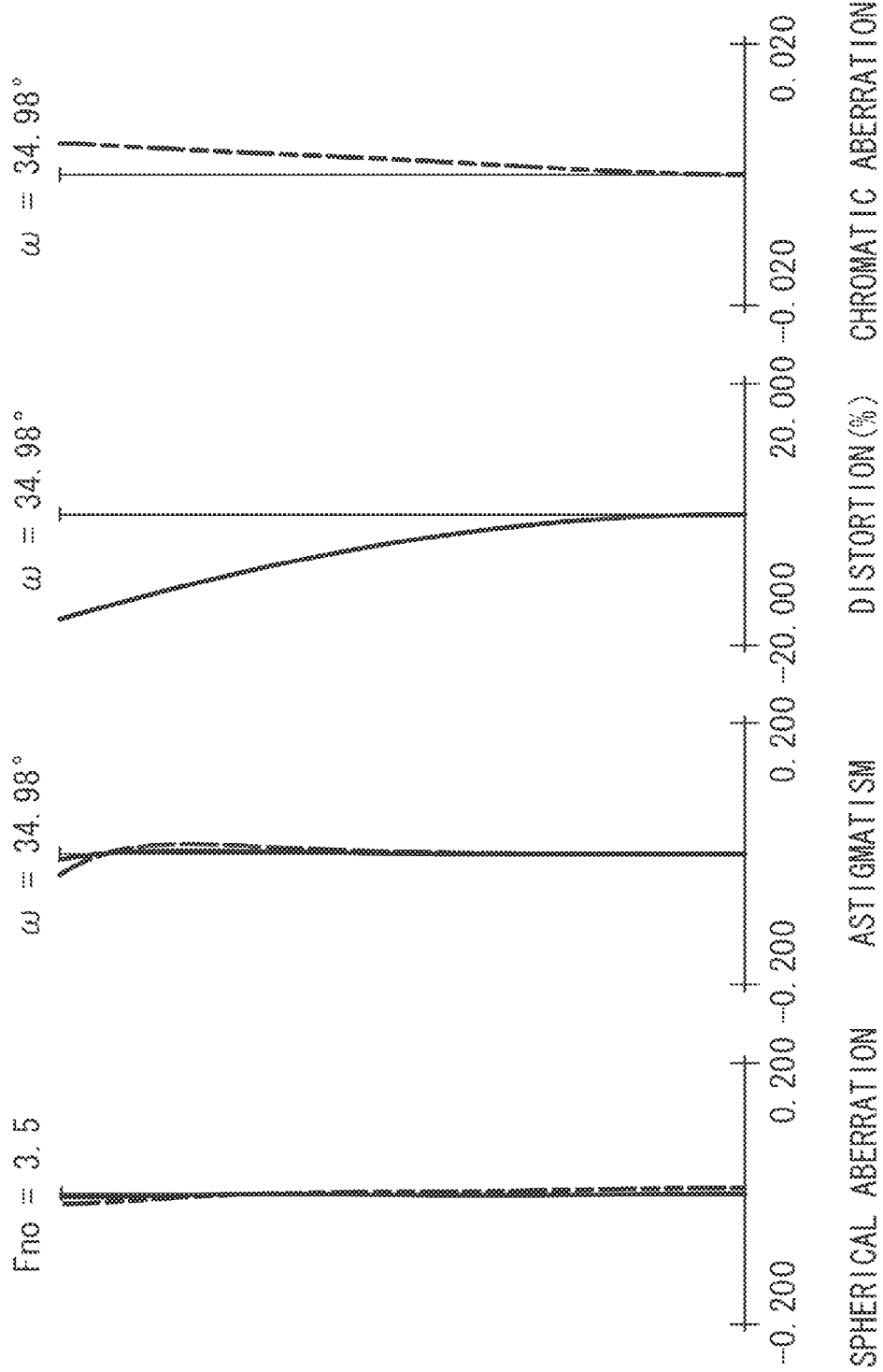

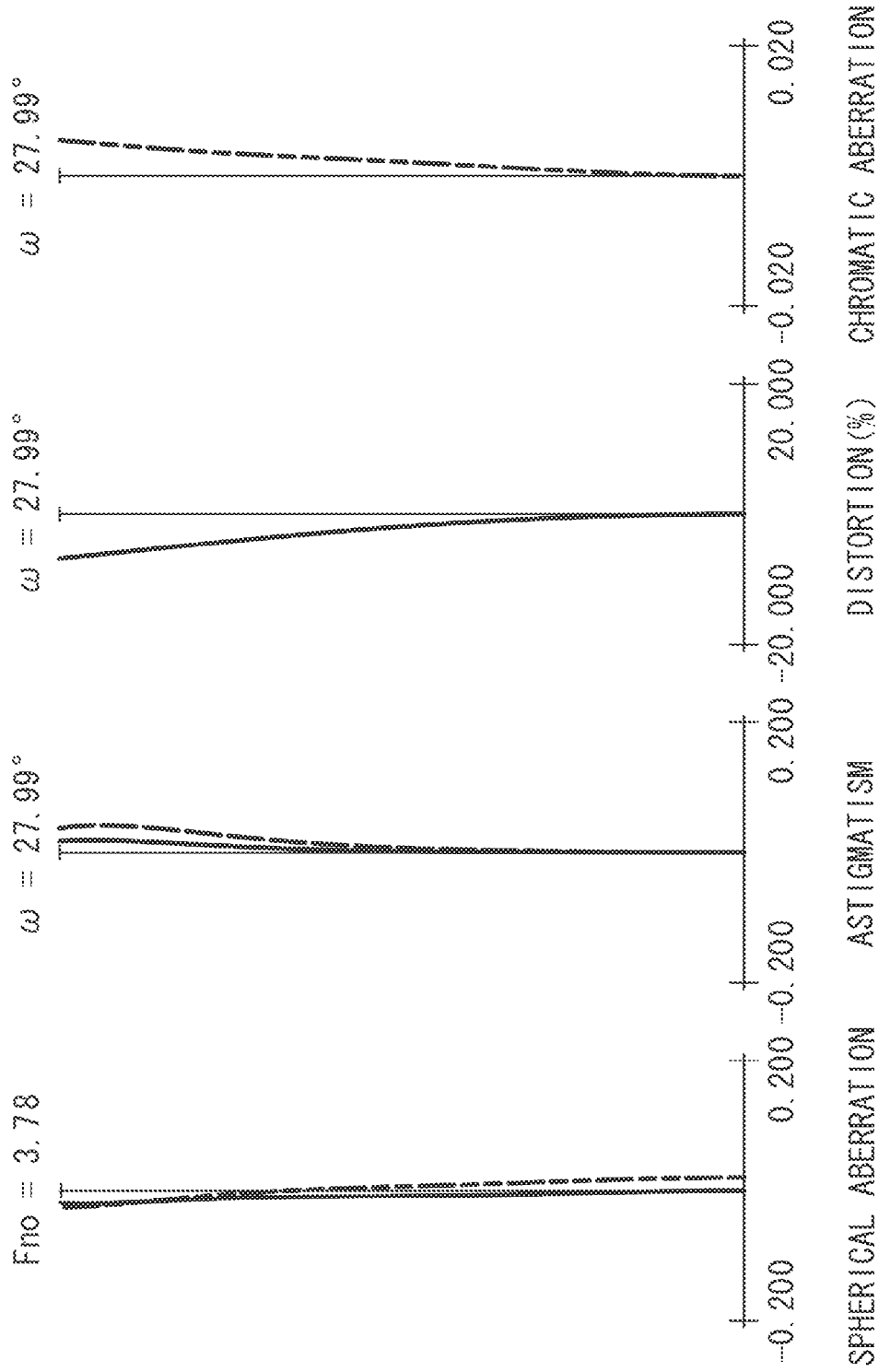

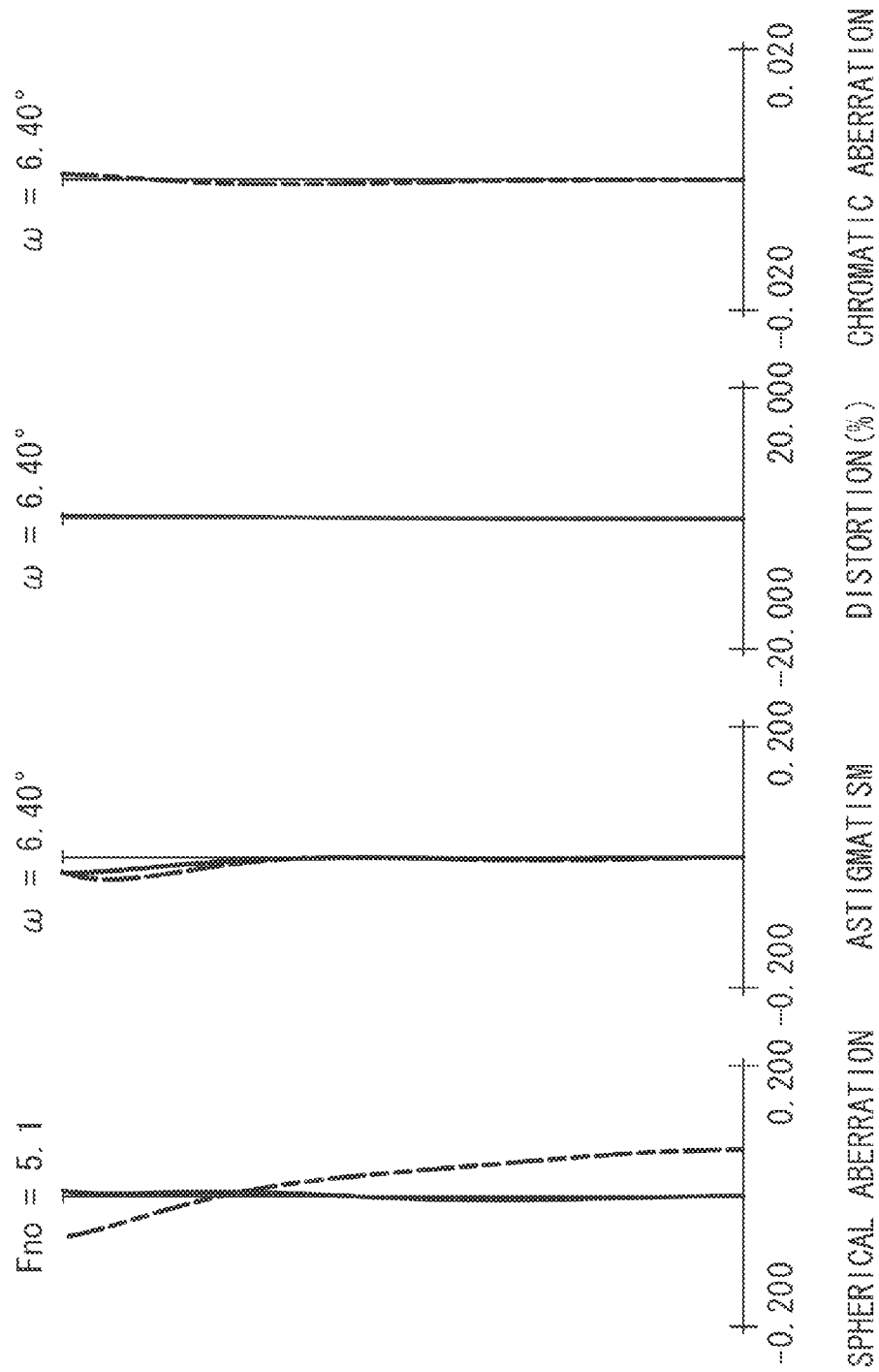

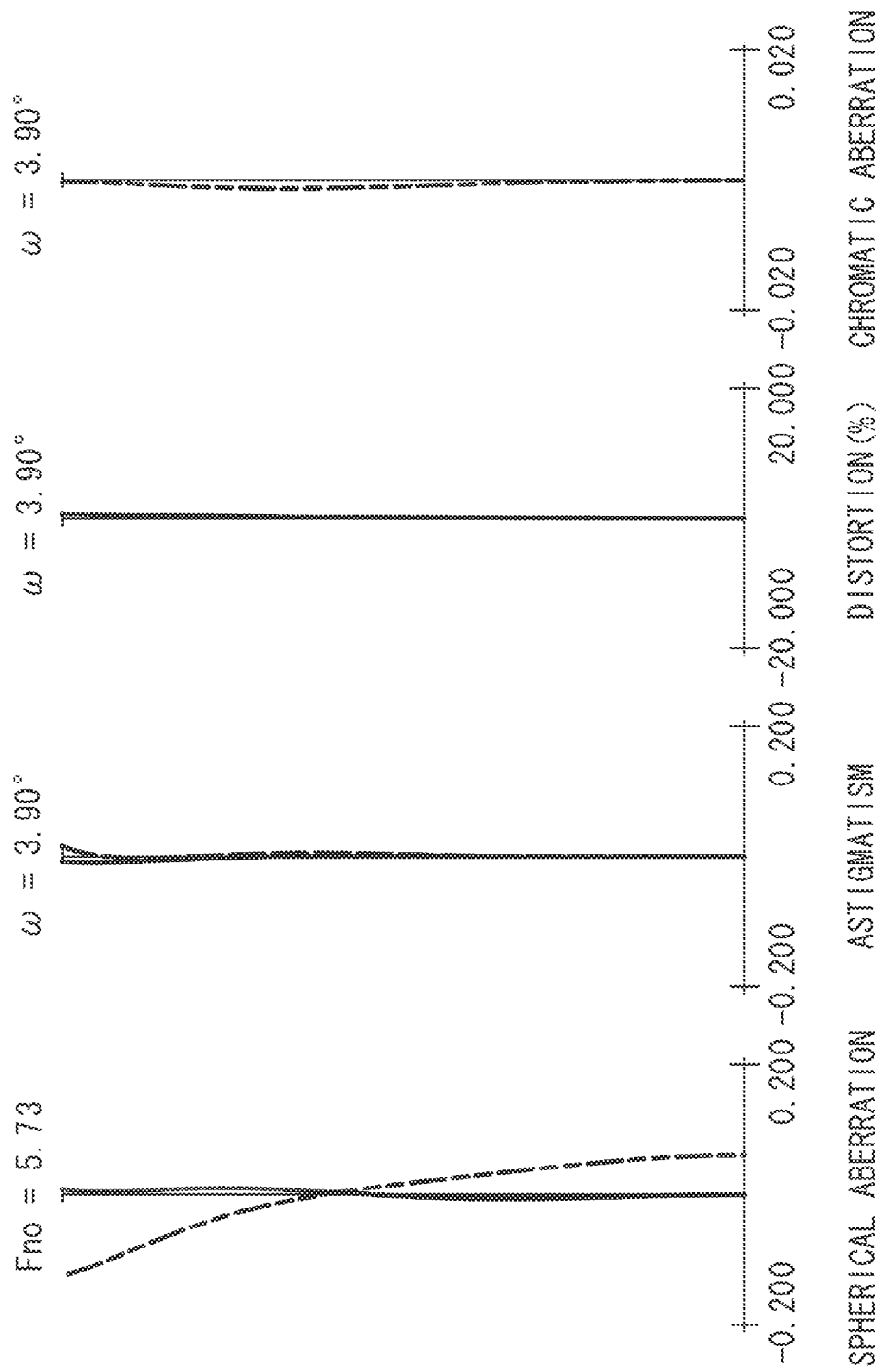

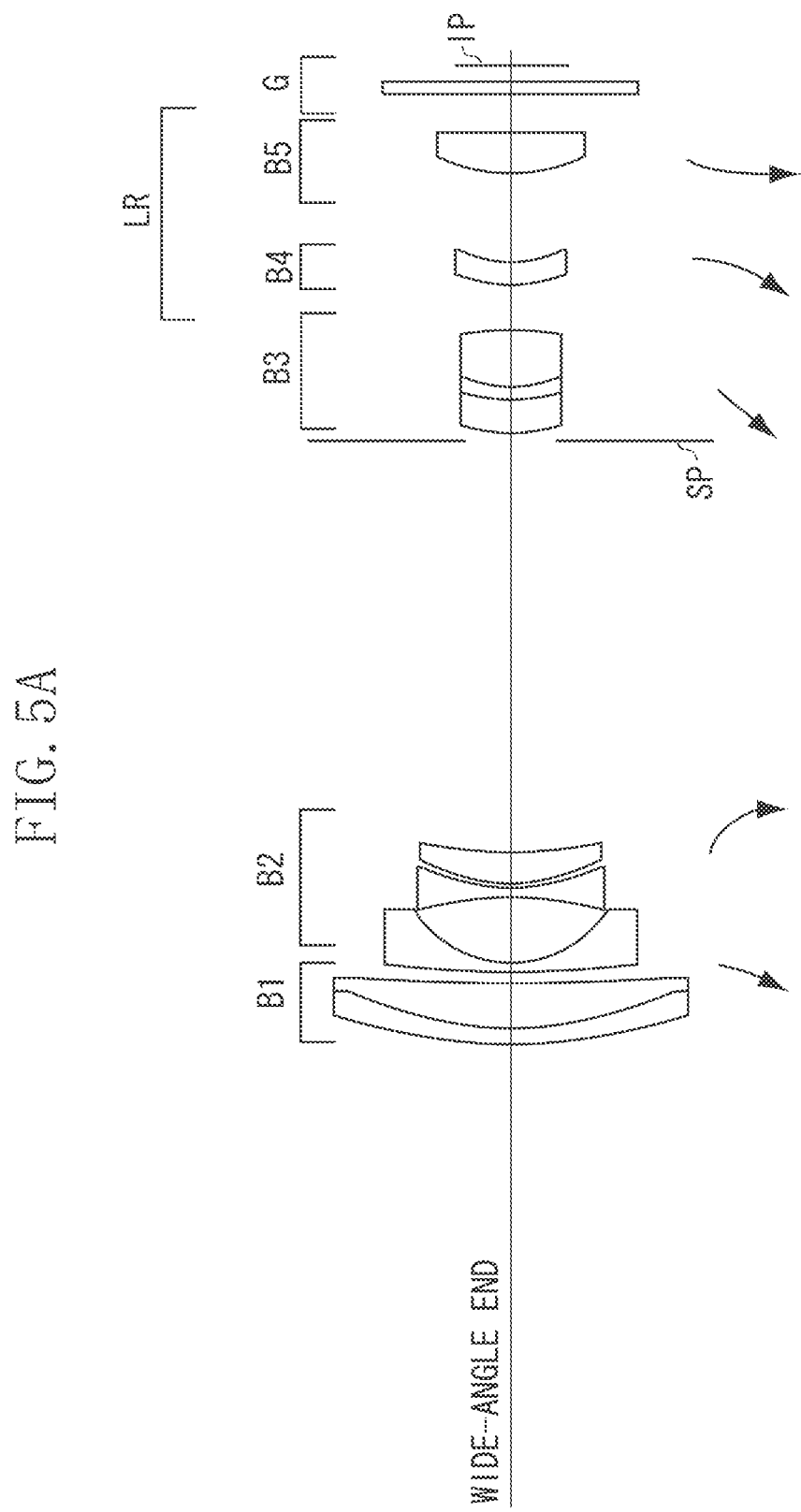

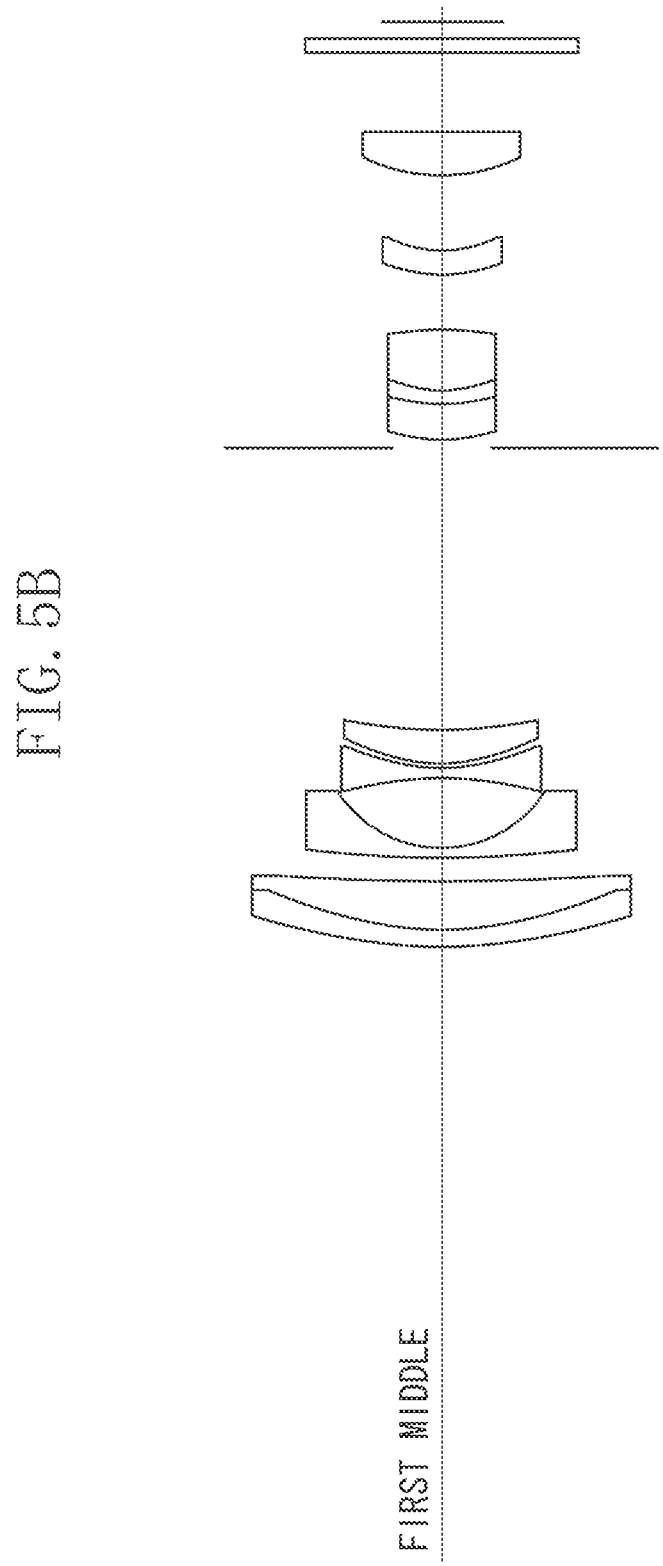

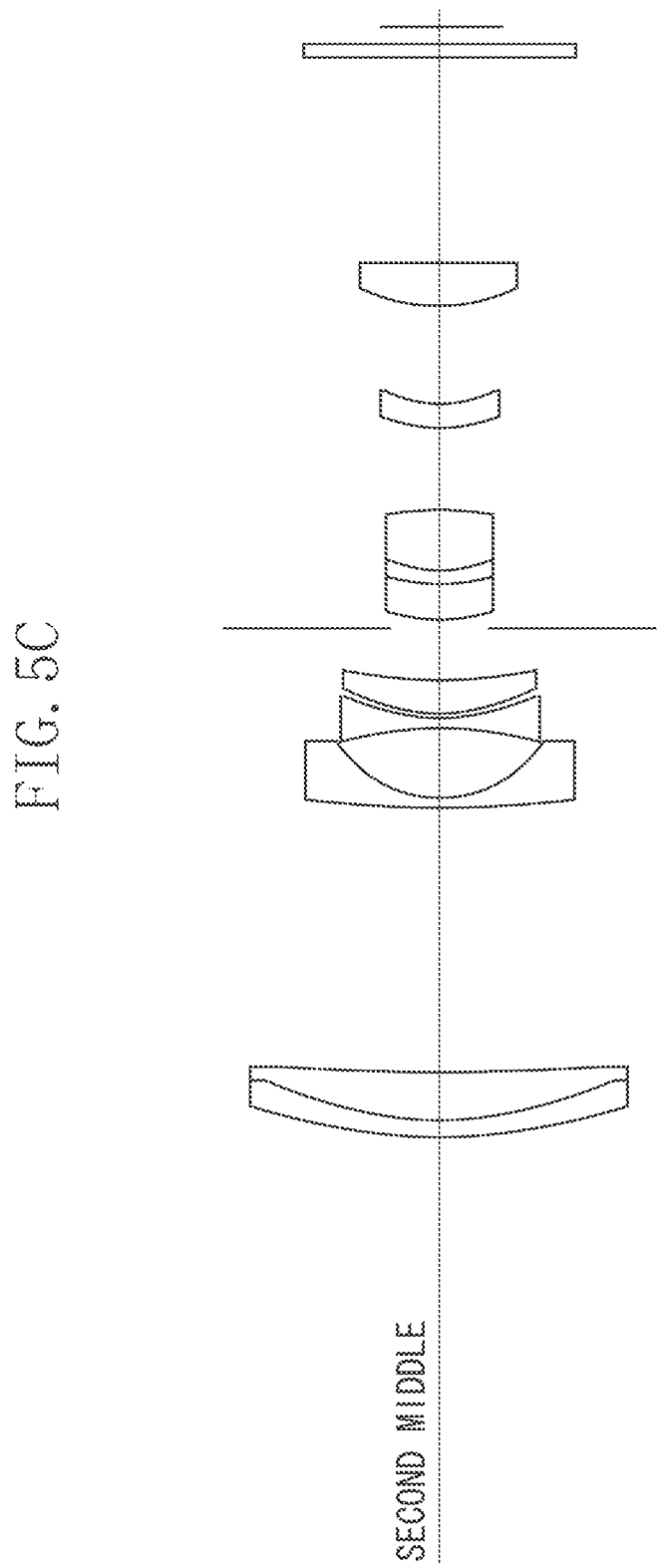

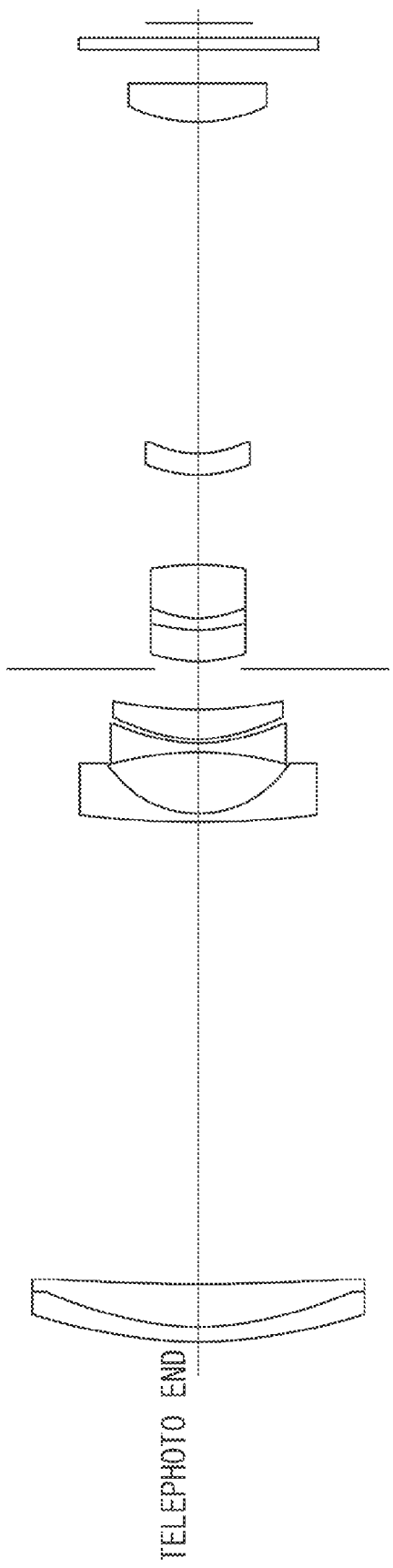

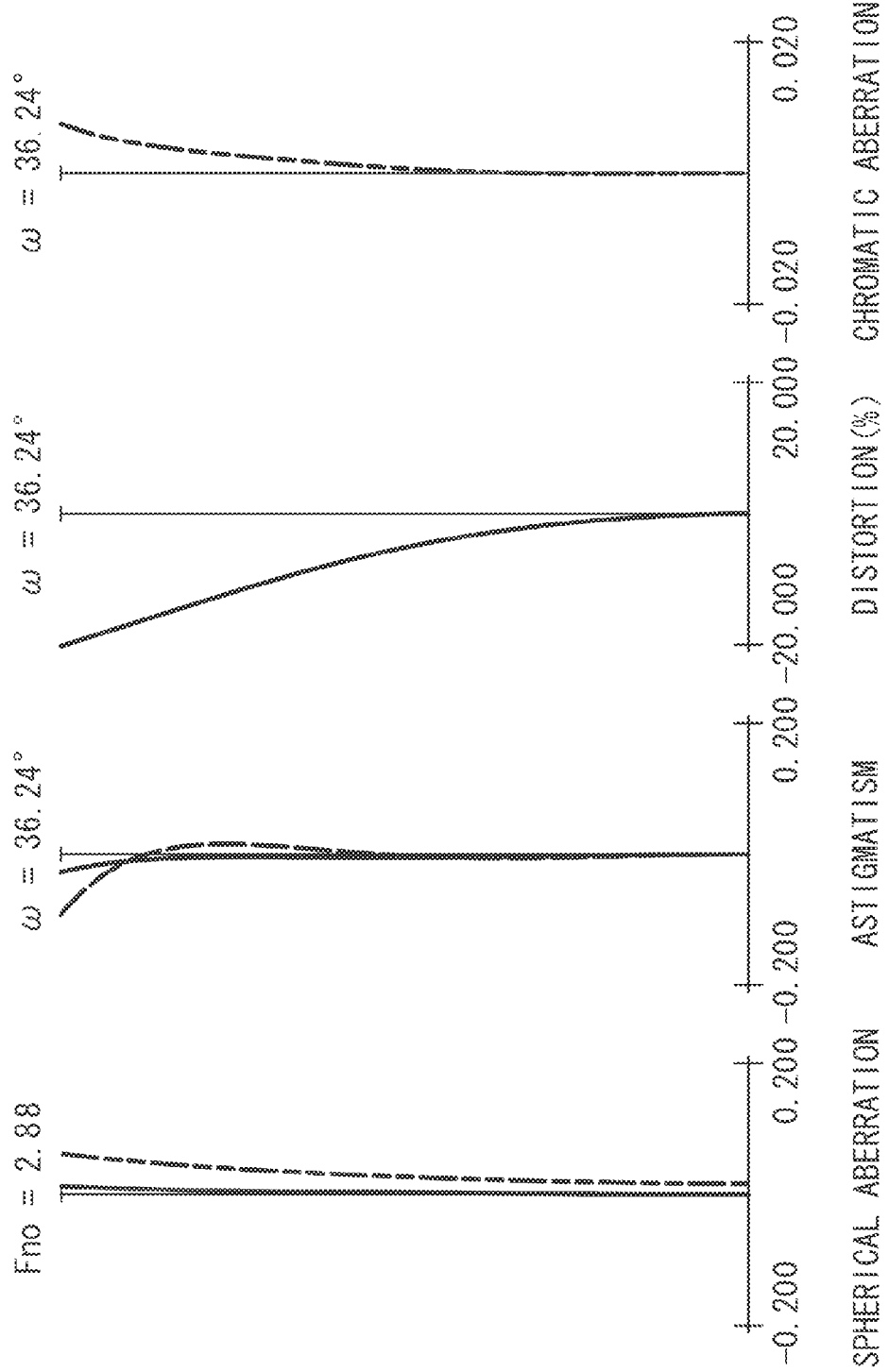

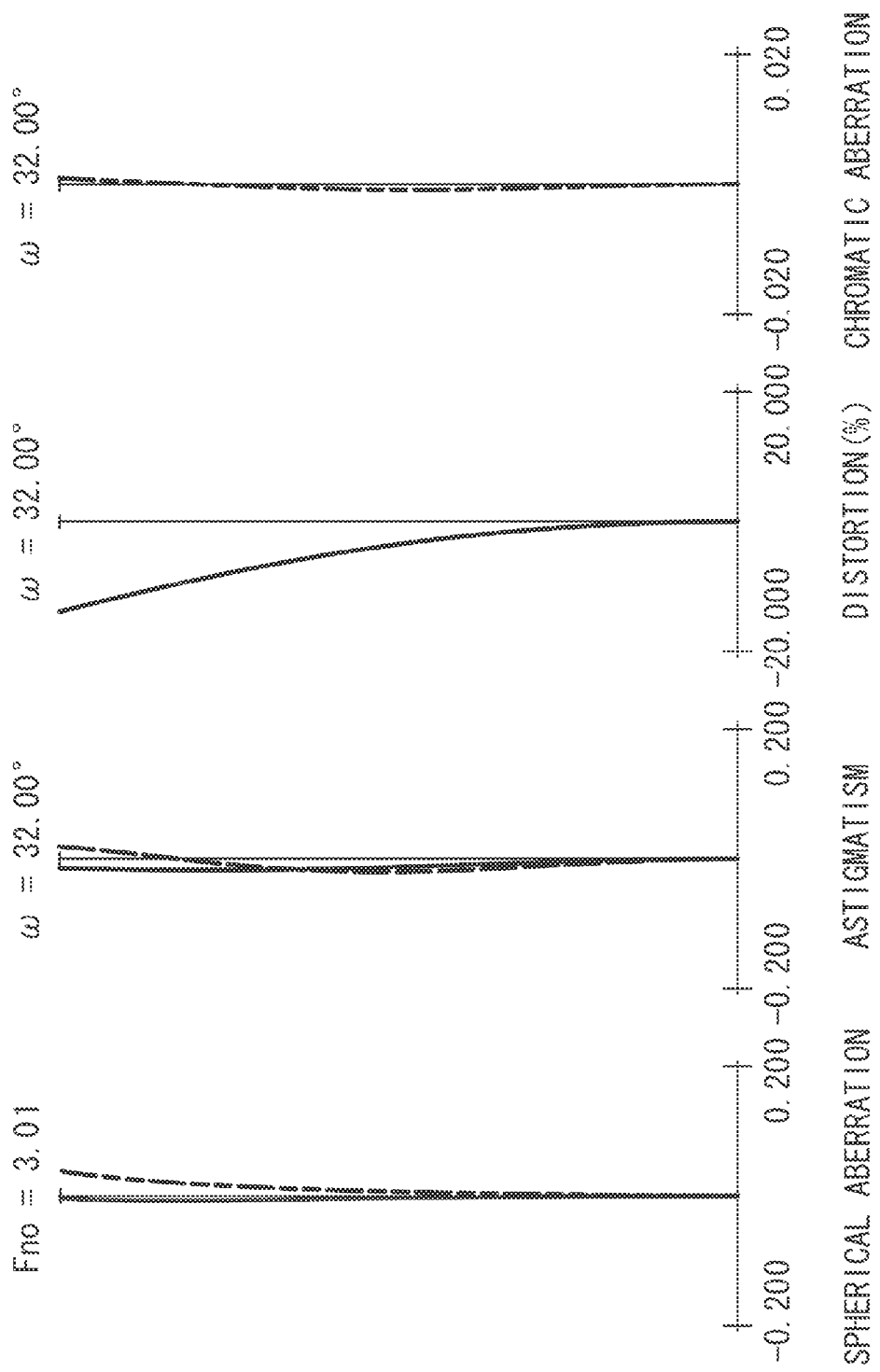

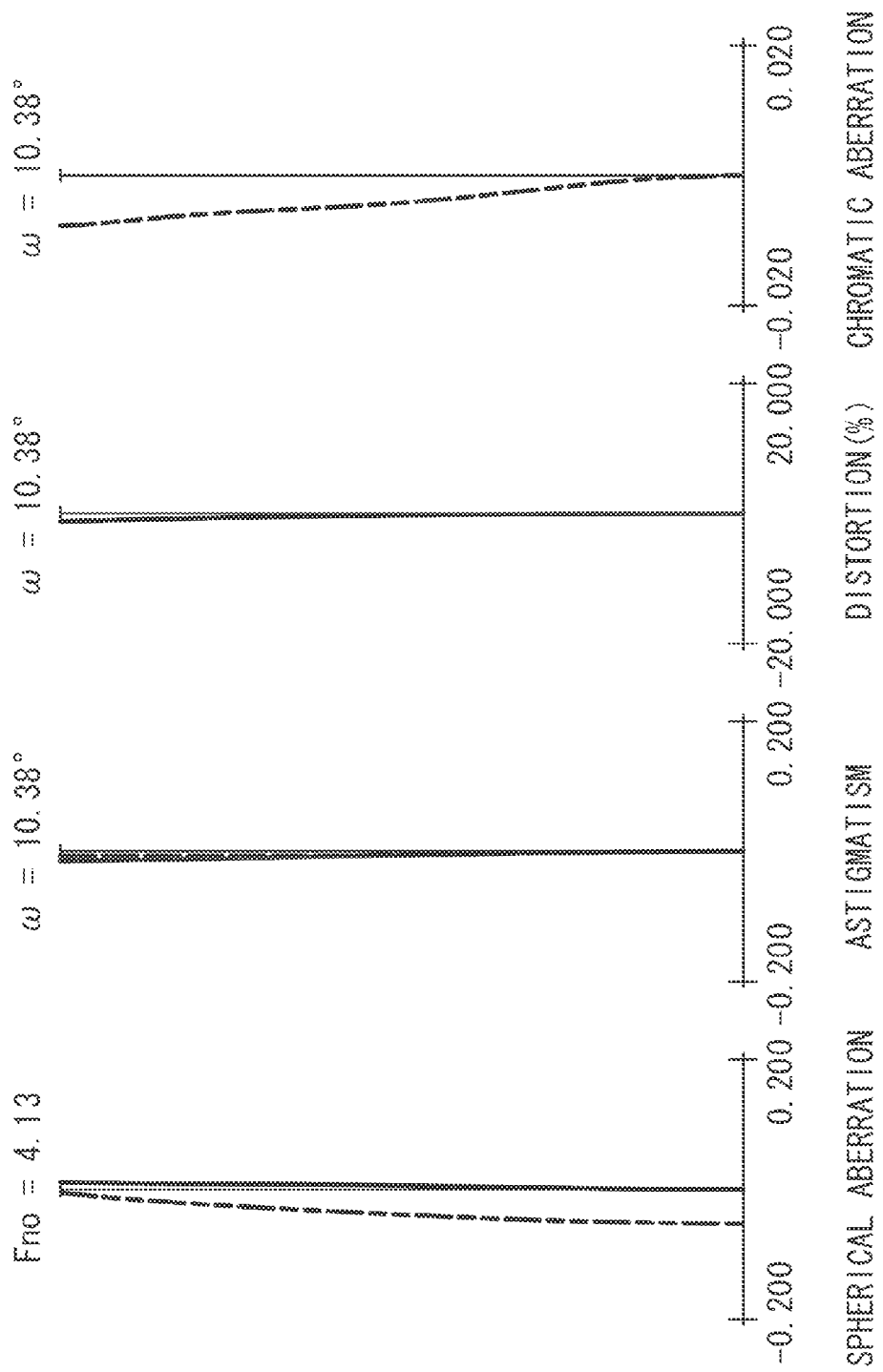

ZOOM LENS AND IMAGE PICKUP APPARATUS INCLUDING THE ZOOM LENS

BACKGROUND OF THE INVENTION

1. Field of the Invention

The present invention relates to a zoom lens and an image pickup apparatus including the zoom lens. More specifically, the present invention relates to a zoom lens useful as a photographic optical system used in an image pickup apparatus.

2. Description of the Related Art

A zoom lens that uses a convex lens group at the front is known as a positive-lead type zoom lens. As a positive-lead type zoom lens, a four-unit zoom lens has been used. A four-unit zoom lens of the positive-lead type generally includes, in order from the object side to the image side, a first lens unit having a positive refractive power, a second lens unit having a negative refractive power, a third lens unit having a positive refractive power, and a fourth lens unit having a positive refractive power.

U.S. Pat. No. 7,382,549 discusses a small-size zoom lens whose first lens unit is constituted by one negative lens and one positive lens and whose second lens unit is constituted by two negative lenses and one positive lens. U.S. Pat. No. 7,206,137 discusses a small-size zoom lens whose first lens unit is monotonously moved towards the object side during zooming. U.S. Pat. No. 7,304,805 discusses a five-unit zoom lens which includes, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power.

In order to achieve a small-size positive-lead type zoom lens having a predetermined level of zoom ratio, it is necessary to increase the refractive power of each lens unit included in the zoom lens with as small a number of lenses as possible. However, the positive-lead type zoom lens necessarily requires a thick lens as the refractive power of each lens surface becomes large.

As a result, if the total size of the entire zoom lens is not sufficiently reduced, various types of aberrations often occur. Based on this, positive-lead type zoom lenses having small size, wide angle of view, and a high zoom ratio have been proposed. However, in an image pickup apparatus (camera) in which each lens unit is retractable when the camera is not used or powered off, a conspicuous error, such as a tilt of a lens or a lens unit, may occur due to its structural characteristic.

In this case, if a lens or a lens unit has a high sensitivity to errors, the optical performance may greatly degrade. For example, the phenomenon of image shake may occur during zooming. In order to prevent the above-described problems, it is desired that the sensitivity of a lens or a lens unit be suppressed to a level as low as possible without affecting performance.

In a four-unit zoom lens or a five-unit zoom lens, in order to achieve a small-size zoom lens having a high zoom ratio and a high optical performance at the same time, it is desirable to appropriately set size and optical parameters for each constituent lens included in the second lens unit and the third lens unit among the lens units included in the zoom lens. More specifically, when a small-size zoom lens with high optical performance is desired, it becomes significant to appropriately set a lens configuration, such as the zoom type (the number of lens units and the refractive power of each lens unit), the moving locus of each lens unit during zooming, and the share of power on each lens unit for variable magnification.

One of the main obstacles in obtaining the above-desired goals is that the total size of the zoom lens becomes large when the zoom ratio is increased. In addition, in a large size zoom lens, the amount of variation of various aberrations that occur during zooming may increase. As a result, it becomes very difficult to achieve high optical performance for the entire zooming range and for the entire image plane.

SUMMARY OF THE INVENTION

The present invention directed to a small-size zoom lens having a high optical performance for the entire zooming range from the wide-angle end to the telephoto end and having a high zoom ratio, and to an image pickup apparatus having the zoom lens.

According to an aspect of the present invention, a zoom lens includes, in order from an object side to an image side, a first lens unit having a positive refractive power, a second lens unit having a negative refractive power, a third lens unit having a positive refractive power, and a rear lens group including one or more lens units. During zooming, the first lens unit moves along a locus convex towards the image side, and the second lens unit and the third lens unit move such that an interval between the first lens unit and the second lens unit becomes larger at a telephoto end than at a wide-angle end and an interval between the second lens unit and the third lens unit becomes smaller at the telephoto end than at the wide-angle end. The third lens unit includes a positive lens and a negative lens. When $\beta 2W$ and $\beta 2T$ are image forming magnifications of the second lens unit at the wide-angle end and at the telephoto end, respectively, $\beta 3W$ and $\beta 3T$ are image forming magnifications of the third lens unit at the wide-angle end and at the telephoto end, respectively, $f2$ is a focal length of the second lens unit, and $fT$ is a focal length of the entire zoom lens at the telephoto end, the following conditions are satisfied:

$$0.10 < (\beta 2T/\beta 2W)/(\beta 3T/\beta 3W) < 1.65$$

$$0.01 < |f2|/fT < 0.15.$$

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 1A, 1B, 1C and 1D are lens cross sections of a zoom lens at the wide-angle end, at a first middle zoom position, at a second middle zoom position and at a telephoto end, respectively, according to a first exemplary embodiment of the present invention.

FIGS. 2A, 2B, 2C and 2D are aberration charts of the zoom lens at the wide-angle end, at the first middle zoom position, at the second middle zoom position and at the telephoto end, respectively, according to the first exemplary embodiment.

FIGS. 3A, 3B, 3C and 3D are lens cross sections of a zoom lens at the wide-angle end, at the first middle zoom position, at the second middle zoom position and at the telephoto end, respectively, according to a second exemplary embodiment of the present invention.

FIGS. 4A, 4B, 4C and 4D are aberration charts of the zoom lens at the wide-angle end, at the first middle zoom position, at the second middle zoom position and at the telephoto end, respectively, according to the second exemplary embodiment.

FIGS. 5A, 5B, 5C and 5D are lens cross sections of a zoom lens at the wide-angle end, at the first middle zoom position, at the second middle zoom position and at the telephoto end, respectively, according to a third exemplary embodiment of the present invention.

FIGS. 6A, 6B, 6C and 6D are aberration charts of the zoom lens at the wide-angle end, at the first middle zoom position, at the second middle zoom position, and at the telephoto end, respectively, according to the third exemplary embodiment.

DESCRIPTION OF THE EMBODIMENTS

Figure 1C:
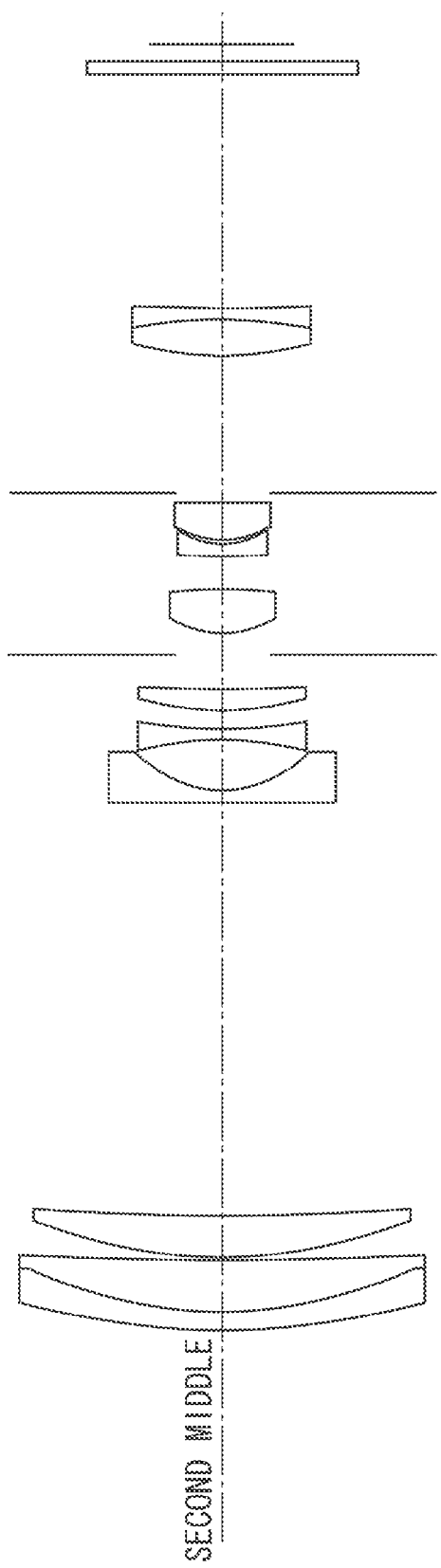
Figure 1D:
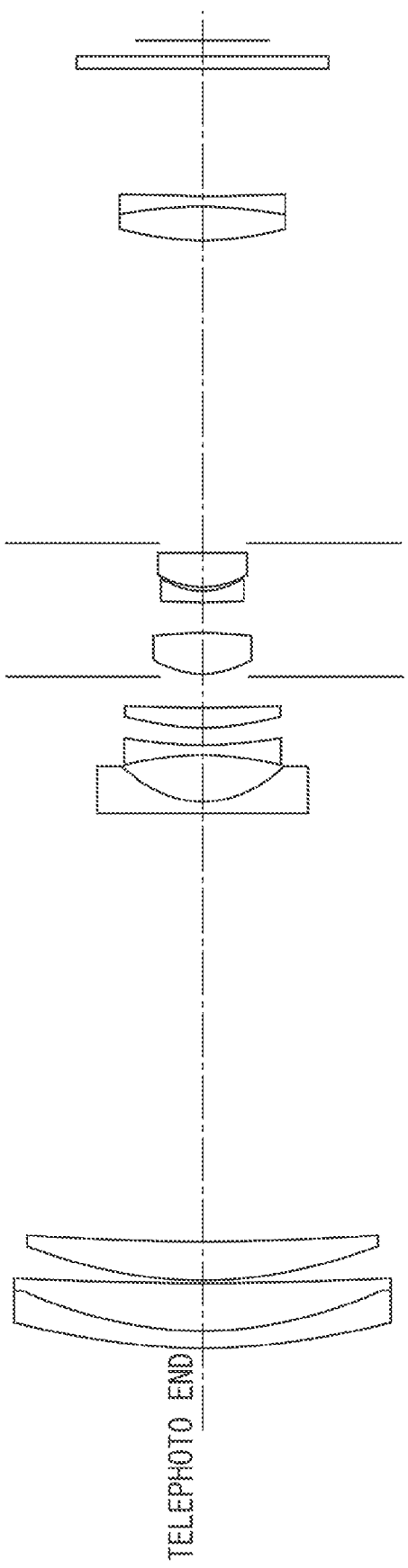
Figure 6D:
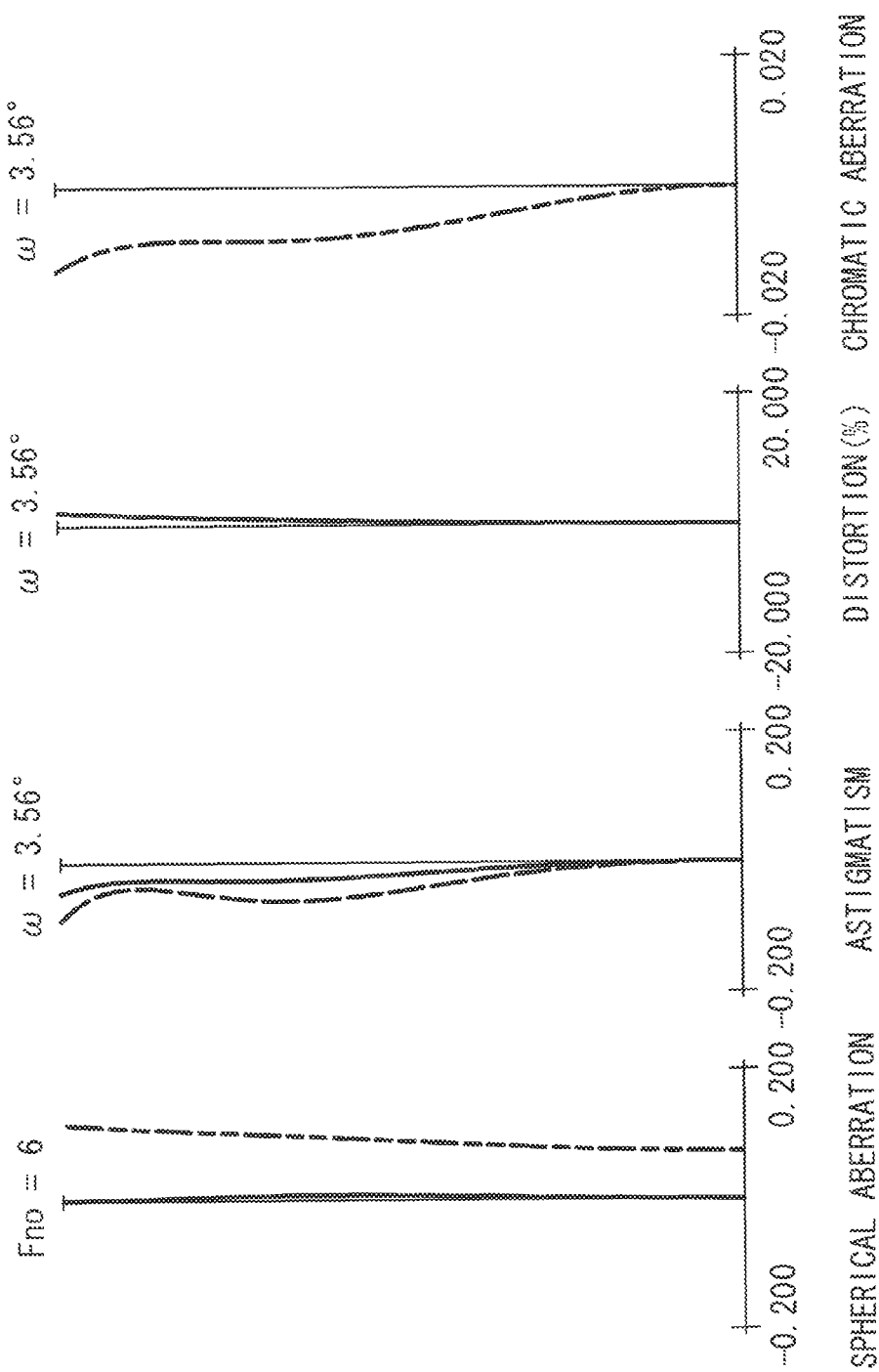

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials considered to be known by one of ordinary skill in the relevant art may not be discussed in detail for the sake of brevity, but are intended to be part of the enabling description where appropriate. For example, the fabrication of the lens elements and their materials is not discussed in detail herein, but it is considered that a person of ordinary skill in the art would be familiar with those details.

In all of the examples illustrated and discussed herein any specific values, for example, the zoom ratio and F-number, should be interpreted to be illustrative only and non limiting. Thus, other examples other than the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens.

A zoom lens according to an exemplary embodiment of the present invention includes, in order from the object side to the image side, a first lens unit having a positive refractive power (optical power being defined as the inverse of the focal length), a second lens unit having a negative refractive power, a third lens unit having a positive refractive power, and a rear lens group including one or more lens units.

During zooming from the wide-angle end (short focal length end) to the telephoto end (long focal length end), the first lens unit moves along a locus that is convex towards the image side, and the second lens unit and the third lens unit move such that an interval (distance) between the first lens unit and the second lens unit becomes larger at the telephoto end than at the wide-angle end, and an interval (distance) between the second lens unit and the third lens unit becomes smaller at the telephoto end than at the wide-angle end.

FIGS. 1A through 1D are lens cross sections of a zoom lens according to a first exemplary embodiment at the wide-angle end, at a first middle zoom position, at a second middle zoom position, and at the telephoto end. FIGS. 2A through 2D are aberration charts of the zoom lens according to the first exemplary embodiment at the wide-angle end, at the first middle zoom position, at the second middle zoom position, and at the telephoto end. The first exemplary embodiment is a zoom lens having a zoom ratio of 13.56 and an aperture ratio ranging from 3.40 to 6.21.

FIGS. 3A through 3D are lens cross sections of a zoom lens according to a second exemplary embodiment at the wide-angle end, at the first middle zoom position, at the second middle zoom position, and at the telephoto end. FIGS. 4A through 4D are aberration charts of the zoom lens according to the second exemplary embodiment at the wide-angle end, at the first middle zoom position, at the second middle zoom position, and at the telephoto end. The second exemplary embodiment is a zoom lens having a zoom ratio of 11.45 and an aperture ratio ranging from 3.50 to 5.73.

FIGS. 5A through 5D are lens cross sections of a zoom lens according to a third exemplary embodiment at the wide-angle end, at the first middle zoom position, at the second middle zoom position, and at the telephoto end. FIGS. 6A through 6D are aberration charts of the zoom lens according to the third exemplary embodiment at the wide-angle end, at the first middle zoom position, at the second middle zoom position, and at the telephoto end. The third exemplary embodiment is a zoom lens having a zoom ratio of 13.61 and an aperture ratio ranging from 2.88 to 6.00.

Figure 7:
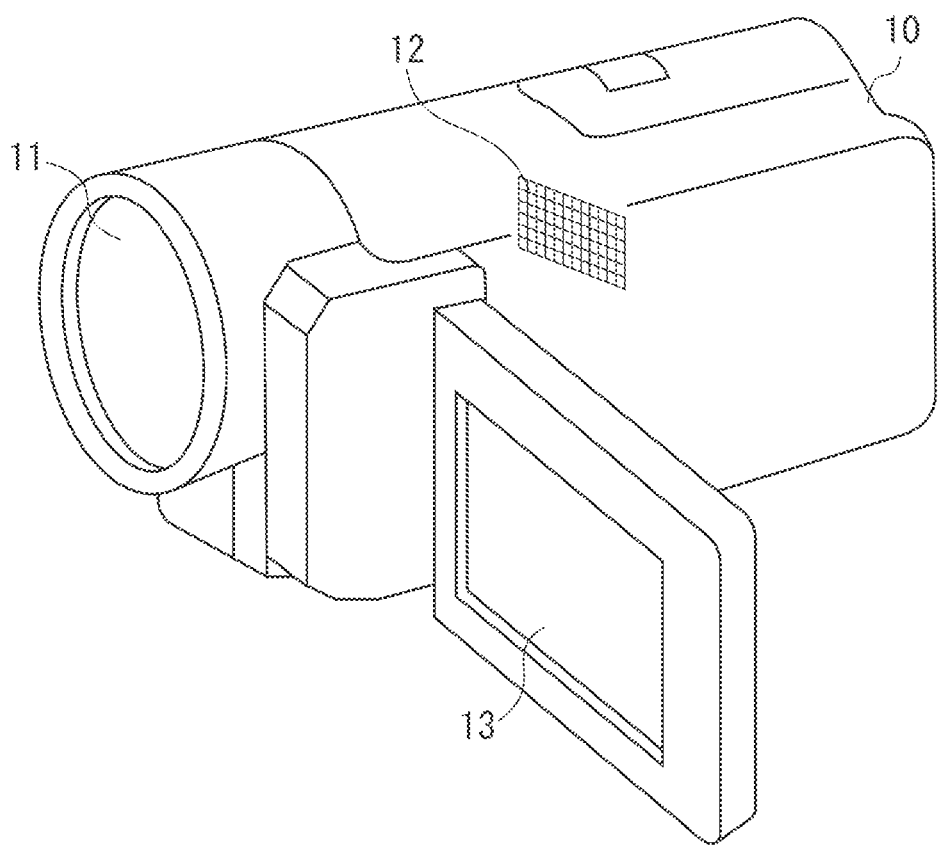
FIG. 7 illustrates main components of video recording apparatus as an example of an image pickup apparatus according to an exemplary embodiment of the present invention.
Figure 8:
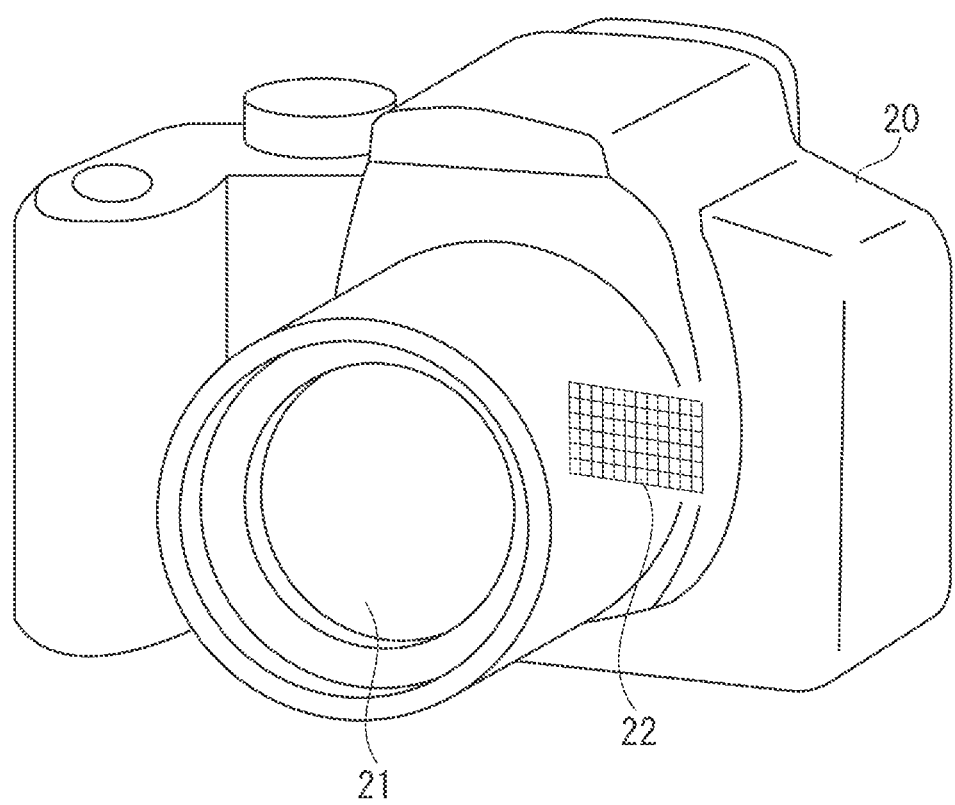
FIG. 8 illustrates main components of photographing apparatus as an example of an image pickup apparatus according to a further exemplary embodiment of the present invention.

FIG. 7 illustrates main components of a video camera (image pickup apparatus) including the zoom lens according to an exemplary embodiment of the present invention. FIG. 8 illustrates main components of a digital still camera (image pickup apparatus) including the zoom lens according to an exemplary embodiment of the present invention.

The zoom lens according to each exemplary embodiment is a photographic lens system used in an image pickup apparatus, such as a video camera, a digital still camera, a silver-halide film camera, or a TV camera. The zoom lens according to each exemplary embodiment may also be used as a projection optical system for a projection apparatus (projector).

In each of the diagrams showing a cross section of the zoom lens (FIGS. 1A-1D, 3A-3D, and 5A-5D), when "i" denotes an order of a lens unit from the object side to the image side, "Bi" denotes an i-th lens unit. "LR" denotes a rear lens group including one or more lens units. Furthermore, "SP" denotes an aperture stop. The aperture stop SP determines (restricts) a light flux of a full-aperture F-number (Fno). "FP" denotes a flare cut stop, whose opening diameter is invariable and which is configured to cut unnecessary light.

"G" denotes an optical block, such as an optical filter, a faceplate, a low-pass filter, or an infrared cut filter. "IP" denotes an image plane. The image plane IP is, when the zoom lens according to an exemplary embodiment of the present invention is used as a photographic optical system of a video camera or a digital camera, equivalent to an imaging plane of a solid-state image sensor (photoelectric conversion element), such as a charge-coupled device (CCD) sensor or a complementary metal-oxide semiconductor (CMOS) sensor. If the zoom lens according to an exemplary embodiment of the present invention is used as a photographic optical system of a silver-halide film camera, the image plane IP is a photosensitive surface equivalent to a film surface of the optical system of the silver-halide film camera. In each of the diagrams showing a cross section of the zoom lens (FIGS. 1A-1D, 3A-3D, and 5A-5D), each lens unit moves along a moving locus indicated by an arrow during zooming (variable magnification) from the wide-angle end to the telephoto end.

In each aberration chart (FIGS. 2A through 2D, 4A through 4D, and 6A through 6D), "Fno" denotes an F-number. "ω" denotes a half angle of view, which is equivalent to an angle of view determined based on a value acquired by ray tracing.

In a portion of each aberration chart (FIGS. 2A through 2D, 4A through 4D, and 6A through 6D) showing spherical aberration, the solid line denotes spherical aberration with respect to d-line light (wavelength: 587.6 nm). The alternate long and two short dashes line denotes spherical aberration with respect to g-line light (wavelength: 435.8 nm).

In a portion of each aberration chart (FIGS. 2A through 2D, 4A through 4D, and 6A through 6D) showing astigmatism, the solid line and the dashed line denote a sagittal image plane and a meridional image plane, respectively, with respect to d-line light. Distortion is represented with respect to d-line light.

In a portion of each aberration chart (FIGS. 2A through 2D, 4A through 4D, and 6A through 6D) showing chromatic aberration of magnification, the alternate long and two short dashes line denotes chromatic aberration of magnification with respect to g-line light.

In each of the following exemplary embodiments, each of the wide-angle end and the telephoto end refers to a zooming position when a magnification varying lens unit is positioned at each of the ends of a range in which the magnification varying lens unit can mechanically move along the optical axis.

A zoom lens according to each exemplary embodiment includes, in order from the object side to the image side and arranged along an optical axis thereof, a first lens unit B1 having a positive refractive power, a second lens unit B2 having a negative refractive power, a third lens unit B3 having a positive refractive power, and a rear lens group LR including one or more lens units. During zooming, the first lens unit B1 moves along a locus convex towards the image side.

In addition, during zooming, the second lens unit B2 and the third lens unit B3 move such that an interval between the first lens unit B1 and the second lens unit B2 becomes larger at the telephoto end than at the wide-angle end and an interval between the second lens unit B2 and the third lens unit B3 becomes smaller at the telephoto end than at the wide-angle end.

In the first and the second exemplary embodiments, the rear lens group LR is constituted by a fourth lens unit B4 having a positive refractive power, which moves during zooming. In the third exemplary embodiment, the rear lens group LR is constituted by a fourth lens unit B4 having a negative refractive power and a fifth lens unit B5 having a positive refractive power, which move during zooming. However, in each exemplary embodiment, the rear lens group LR can include an arbitrary number of lens units. In other words, in each exemplary embodiment, the rear lens group LR can include at least one lens unit. The aperture stop SP moves integrally with the third lens unit B3 during zooming.

In order to achieve a high zoom ratio and to appropriately correct various aberrations, the zoom lens according to each exemplary embodiment includes the first through the third lens units having a positive, a negative, and a positive refractive power, respectively. During zooming from the wide-angle end to the telephoto end, the interval between the first lens unit B1 and the second lens unit B2 is changed to execute variable magnification. In addition, the third lens unit B3 having the aperture stop SP is also moved to arbitrarily displace an entrance pupil at the telephoto end. Accordingly, the zoom lens according to each exemplary embodiment can reduce the total size thereof.

In addition, the third lens unit B3 moves during zooming. Accordingly, the effect of variable magnification by the first lens unit B1 and the second lens unit B2 can be shared by the third lens unit B3. Therefore, the amount of movement of the first lens unit B1 and the second lens unit B2 during zooming can be reduced. As a result, the zoom lens according to each exemplary embodiment can easily reduce the lens total length thereof at the telephoto end (the distance from the first lens surface to the image plane).

During zooming from the wide-angle end to the telephoto end, the effective diameter of the front lens becomes largest at a zooming position at the wide-angle end or at a position slightly zoomed from the wide-angle end towards the telephoto end. In order to displace the position of the entrance pupil at the above-described zooming positions from the image side towards the object side, the first lens unit B1 is moved along a locus convex towards the image side during zooming.

By moving the first lens unit B1 along a locus convex towards the image side, the effective diameter of the front lens can be reduced while effectively preventing or suppressing a large decrease of light amount around the image plane at the same time.

In each exemplary embodiment, the third lens unit B3 includes at least one positive lens and at least one negative lens. By employing the above-described configuration of the third lens unit B3, each exemplary embodiment can suppress variation of axial chromatic aberration, which may occur during zooming due to the increase of the share of power of the third lens unit B3 for variable magnification.

In each exemplary embodiment, the first lens unit B1 and the third lens unit B3 are located closer to the object side at the telephoto end than at the wide-angle end. Furthermore, the first lens unit B1 moves along a locus convex towards the image side. Accordingly, each exemplary embodiment can reduce the effective diameter of the first lens unit B1.

Moreover, in the zoom lens according to each exemplary embodiment, the first lens unit B1 is assigned with a low refractive power and the second lens unit B2 is assigned with a relatively high refractive power. Accordingly, each exemplary embodiment can reduce the distance between the first lens unit B1 and the aperture stop SP at the wide-angle end. With the above-described configuration, each exemplary embodiment can reduce the lens effective diameter of the first lens unit B1.

Furthermore, in each exemplary embodiment, the third lens unit B3 is assigned with a relatively high refractive power. Accordingly, each exemplary embodiment can reduce the distance between the aperture stop SP and the image plane IP. As a result, each exemplary embodiment can reduce the lens total length at the wide-angle end.

In addition, in each exemplary embodiment, the first lens unit B1 is moved to be positioned closer to the object side at the telephoto end than at the wide-angle end. Furthermore, in each exemplary embodiment, the interval between the first lens unit B1 and the second lens unit B2 is larger at the telephoto end than at the wide-angle end. With this configuration, each exemplary embodiment can achieve a high variable magnification effect.

Furthermore, during zooming from the wide-angle end to the telephoto end, the third lens unit B3 is moved towards the object side. In other words, the interval between the second lens unit B2 and the third lens unit B3 is larger at the telephoto end than at the wide-angle end. With this configuration, each exemplary embodiment can achieve a high variable magnification effect.

As described above, in each exemplary embodiment, the effect of variable magnification is shared at a plurality of positions. With the above-described configuration, each exemplary embodiment can reduce the amount (stroke) of movement of each lens unit for variable magnification while achieving a high zoom ratio. Furthermore, each exemplary embodiment can reduce the lens total length at the telephoto end in particular.

The zoom lens according to each exemplary embodiment executes focusing from an infinitely-distant object to a short-distance object by moving the last lens unit towards the object side. More specifically, the first and the second exemplary embodiments execute focusing by moving the fourth lens unit B4. The third exemplary embodiment executes focusing by moving the fifth lens unit B5.

With the above-described configuration, each exemplary embodiment of the present invention can easily reduce the lens total length at the wide-angle end and at the telephoto end while achieving a high zoom ratio at the same time.

In the first and the second exemplary embodiments, the flare cut stop FP is located between the third lens unit B3 and the fourth lens unit B4 to prevent a sharp decrease of the amount of light around the image plane. The zoom lens according to each exemplary embodiment uses an aspheric lens for the third lens unit B3. Accordingly, each exemplary embodiment can appropriately correct spherical aberration and coma at the wide-angle end while securing a predetermined level of brightness.

In the third exemplary embodiment, the second lens unit B2 includes an aspheric lens. With this configuration, the third exemplary embodiment can improve the optical performance and effectively prevents tilting of the image plane at the wide-angle end in particular.

In particular, it is useful if the surface, on the image side, of a negative lens included in the second lens unit B2 provided closest to the object side has an aspheric shape in which the negative refractive power becomes weaker from the center of the lens towards the periphery thereof. In the zoom lens according to each exemplary embodiment, a shake of a photographed image, which may occur when the entire zoom lens is vibrated (tilted), can be reduced by moving the third lens unit B3 to have a component perpendicular to the optical axis. Alternatively, an arbitrary lens unit can be moved in a direction perpendicular to the optical axis to correct image shake.

In each exemplary embodiment, when W and T are image forming magnifications of the second lens unit B2 at the wide-angle end and at the telephoto end, respectively, β3W and β3T are image forming magnifications of the third lens unit B3 at the wide-angle end and at the telephoto end, respectively, f2 is a focal length of the second lens unit B2, and FT is a focal length of the zoom lens at the telephoto end, the following conditions are satisfied:

$$0.10 < (\beta 2T/\beta 2W)/(\beta 3T/\beta 3W) < 1.65 \quad (1)$$

$$0.01 < |f2|/fT < 0.15 \quad (2).$$

The technical significance of the above-described conditions (1) and (2) will be described in detail below. The condition (1) provides a condition for the share of power for variable magnification of the second lens unit B2 and the third lens unit B3.

If the power assigned to the second lens unit B2 for variable magnification becomes too large exceeding the upper limit value of the condition (1), then a difference between an angle of incidence on the second lens unit B2 (on a refractive surface (lens surface)) of the entire light flux around the image plane at the wide-angle end and an angle of incidence on the second lens unit B2 of the entire light flux around the image plane at the telephoto end becomes excessively large. As a result, a large amount of variation of curvature of field during zooming may occur. Accordingly, in this case, it becomes difficult to appropriately correct curvature of field for the entire zooming range.

On the other hand, if the power assigned to the third lens unit B3 for variable magnification becomes too large exceeding the lower limit value of the condition (1), then it becomes necessary to set a high refractive power to the third lens unit B3. In this case, the radius of curvature of a surface of each lens included in the third lens unit B3 becomes small. As a result, it becomes difficult to correct coma for the entire zooming range.

The condition (2) provides a condition for the focal length of the second lens unit B2 in relation to the focal length of the entire zoom lens at the telephoto end.

If the focal length of the second lens unit B2 becomes too long exceeding the upper limit value of the condition (2), then it becomes necessary to move the first lens unit B1 during zooming by a large amount in order to achieve a high zoom ratio. As a result, the lens total length at the telephoto end may increase. On the other hand, if the focal length of the second lens unit B2 becomes too short exceeding the lower limit value of the condition (2), then the value of the Petzval sum may become very large in the direction of the negative sign. As a result, curvature of field may increase. If the ranges of the above-described conditions (1) and (2) are not exceeded, the above-described problems may not be likely to occur.

Therefore, in this case, it is not necessary to add another lens to the second lens unit B2 or the third lens unit B3 to increase the radius of curvature of each lens surface. Accordingly, the number of lenses included in each lens unit can be reduced. As a result, each exemplary embodiment can achieve a zoom lens whose total size is small and which has a high optical performance.

It is further useful if the zoom lens according to each exemplary embodiment satisfies at least one of the following conditions. In the conditions, nd3$i$, vd3$i$, and θgF3$i$ are a refractive index, an Abbe number, and a relative partial dispersion of a material of at least one positive lens of positive lenses included in the third lens unit B3, respectively. m3 is an amount of movement of the third lens unit B3 during zooming from the wide-angle end to the telephoto end, where the amount of movement m3 is an amount of displacement of the third lens unit B3 at the telephoto end in relation to the image plane along the optical axis compared with an amount of displacement of the third lens unit B3 at the wide-angle end in relation to the image plane along the optical axis (i.e., the positional difference) and where the amount of movement m3 has a negative value on the object side and a positive value on the image side. fW is a focal length of the entire zoom lens at the wide-angle end. f3n is a focal length of at least one negative lens of negative lenses included in the third lens unit B3. f3 is a focal length of the third lens unit B3. f1 is a focal length of the first lens unit B1 (f1). TDT is a total length of the zoom lens at the telephoto end (an air-equivalent distance from the first lens surface to the image plane) (TDT). DSP is an air-equivalent distance from the aperture stop SP to the image plane at the telephoto end (the distance between the aperture stop SP and the image plane calculated when a parallel flat plate member, such as a filter, is removed). At least one of the following conditions can be satisfied:

$$2.7 < \beta 3T/\beta 3W < 5.0 \quad (3)$$

$$1.54 < nd3i < 2.0 \quad (4)$$

$$55 < \nu d3i < 100 \quad (5)$$

$$0.5 < |m3|/\sqrt{(fW \times fT)} < 2.0 \quad (6)$$

$$0.5 < f3/\sqrt{(fW \times fT)} < 1.5 \quad (7)$$

$$0.1 < |\beta 3n|/\beta 3 < 3.0 \quad (8)$$

$$0.3 < DSP/TDT < 0.8 \quad (9)$$

$$0.2 < f1/fT < 1.2 \quad (10)$$

$$-0.00162 \times \nu d3i + 0.642 < \theta gF3i \quad (11)$$

The technical significance of each of the above-described conditions (3) through (11) will be described in detail below.

The condition (3) provides a condition for the image forming magnification β3T of the third lens unit B3 at the telephoto end in relation to the image forming magnification 3W of the third lens unit B3 at the wide-angle end. If the power assigned to the third lens unit B3 for variable magnification becomes too high exceeding the upper limit value of the condition (3), then it becomes difficult to correct spherical aberration and coma.

In addition, if the third lens unit B3 is assigned with a high power for variable magnification, it becomes necessary to increase the refractive power of the third lens unit B3. If the third lens unit B3 is assigned with a high refractive power, the sensitivity of the third lens unit B3 to aberrations at the telephoto end becomes high. As a result, an influence on manufacture errors (eccentricity or tilting of the lens) may increase.

On the other hand, if the power assigned to the third lens unit B3 for variable magnification becomes too low exceeding the lower limit value of the condition (3), then it becomes difficult to achieve a high zoom ratio and reduce the size of the entire zoom lens at the same time. Furthermore, in this case, it becomes necessary to increase the effect by the second lens unit B2 for variable magnification due to the decrease of the variable magnification effect by the third lens unit B3.

In this case, it becomes necessary to increase the power (refractive power) of the second lens unit B2 or the amount of movement of the second lens unit B2 during zooming. As a result, it becomes difficult to reduce the total size of the zoom lens while achieving a high optical performance at the same time.

The conditions (4), (5), and (11) provide a condition for the material of at least one positive lens included in the third lens unit B3. The Abbe number νd and the relative partial dispersion θgF of the material are defined by the following expressions:

$$\nu d = (Nd-1)/(NF-NC)$$

$$\theta gF = (Ng-NF)/(NF-NC)$$

where "Nd", "NF", "NC", and "Ng" denote refractive indices of Fraunhofer lines with respect to d-line light, F-line light, C-line light, and g-line light, respectively.

In each exemplary embodiment, a positive lens constituted by a material that simultaneously satisfies the conditions (4), (5), and (11) is used for the lens constituting the third lens unit B3. Accordingly, the zoom lens according to each exemplary embodiment can effectively execute primary achromatism and appropriately correct a secondary spectrum.

The seventh lens counted from the object side in the first and second exemplary embodiments and the sixth lens counted from the object side in the third exemplary embodiment are constituted by the material that satisfies the conditions (4), (5), and (11) at the same time.

The condition (4) provides a condition for the refractive index of the material of at least one positive lens included in the third lens unit B3. If the upper limit value of the condition (4) is exceeded, then the total weight of the zoom lens cannot be effectively reduced because as the refractive index of a material of an existing optical glass becomes higher, the weight of the material due to gravity increases.

As a result, in this case, an image shake of a photographed image, which may occur when the entire zoom lens is vibrated (tilted), cannot be appropriately corrected by moving the third lens unit B3 in a direction perpendicular to the optical axis as in the first through the third exemplary embodiments.

If the lower limit value of the condition (4) is exceeded, then the refractive index of the material of the positive lens may become very low. In this case, it becomes necessary to increase the curvature of the surface of the positive lens. As a result, the amount of an aberration corresponding to a low-order aberration may increase. In other words, coma, in particular, may increase.

The condition (5) provides a condition for the Abbe number of the material of at least one positive lens included in the third lens unit B3. More specifically, the condition (5) provides a condition for suppressing the variation of axial chromatic aberration, which may occur during zooming, to a minimum.

If the lower limit value of the condition (5) is exceeded, the amount of variation of axial chromatic aberration during zooming may increase. As a result, a large amount of chromatic aberration may occur at the telephoto end when the zoom ratio is increased.

In each exemplary embodiment, by using a material that satisfies the conditions (4), (5), and (11) at the same time, the primary achromatism can be effectively executed, the secondary spectrum can be appropriately corrected, and a high zoom ratio can be easily achieved.

The condition (6) provides a condition for the amount of movement of the third lens unit B3 during zooming. More specifically, the condition (6) primarily provides a condition for effectively reducing the size of the entire zoom lens.

If the amount of movement of the third lens unit B3 during zooming becomes too large exceeding the upper limit value of the condition (6), then in the third lens unit B3, the amount of variation of the distance between an upper ray and a lower ray of the light flux around the image plane from the optical axis at the wide-angle end and at the telephoto end may increase. As a result, it becomes difficult to correct coma for the entire zooming range.

If the lower limit value of the condition (6) is exceeded, it becomes necessary to increase the amount of movement of the second lens unit B2 during zooming to increase the power (the share of power) of the second lens unit B2 for variable magnification. In this case, the amount of variation of curvature of field that may occur during zooming may increase. As a result, it becomes difficult to appropriately correct curvature of field for the entire zooming range.

The condition (7) provides a condition for the refractive power assigned to the third lens unit B3. More specifically, the condition (7) primarily provides a condition for achieving a wide angle of view while appropriately correcting spherical aberration and coma at the same time.

If the refractive power of the third lens unit B3 becomes too low exceeding the upper limit value of the condition (7), then it becomes difficult to reduce the lens total length. Furthermore, it becomes difficult to achieve a high zoom ratio. On the other hand, if the refractive power of the third lens unit B3 becomes too high exceeding the lower limit value of the condition (7), it becomes difficult to correct spherical aberration and coma although it becomes easier to achieve a wide angle of view.

The condition (8) provides a condition for the focal length of at least one negative lens included in the third lens unit B3. If the upper limit value of the condition (8) is exceeded, then the refractive power of the negative lens included in the third lens unit B3 becomes low. Accordingly, it becomes difficult to reduce the lens total length of the third lens unit B3. On the other hand, if the refractive power of the negative lens of the third lens unit B3 becomes too high exceeding the lower limit value of the condition (8), then the value of the Petzval sum may become very large in the direction of the negative sign. As a result, it becomes difficult to correct curvature of field.

The condition (9) provides a condition for normalizing the location of the aperture stop at the telephoto end within the entire zoom lens. If the lower limit value of the condition (9) is exceeded, then the distance of an off-axis light flux of the first lens unit B1 from the optical axis at the telephoto end may become long. As a result, the outer diameter of the lens included in the first lens unit may increase.

If the upper limit value of the condition (9) is exceeded, then the amount of variation of the distance between the optical axis and a peripheral light flux that is incident on the periphery of the image plane of the lens unit that is provided subsequent to the aperture stop SP may increase.

As a result, in order to appropriately correct the aberration of the light flux incident on the periphery of the image plane, it becomes necessary to increase the number of lenses and to use a large number of aspheric surfaces.

The condition (10) provides a condition for the ratio of the focal length of the first lens unit to the focal length of the entire zoom lens at the telephoto end. If the refractive power of the first lens unit B1 becomes too low exceeding the upper limit value of the condition (10), then the amount of movement of the first lens unit B1 or the second lens unit B2 necessary for variable magnification may increase. As a result, it becomes difficult to reduce the lens total length.

On the other hand, if the refractive power of the first lens unit B1 becomes too high exceeding the lower limit value of the condition (10), then the tilting of an image plane, which may occur due to manufacture errors, and the amount of image shake that may occur during zooming may increase although it becomes easier to reduce the lens total length at the telephoto end. As a result, it is required for a lens barrel to be manufactured and assembled at a very high accuracy.

In each exemplary embodiment, the third lens unit B3 can include at least one aspheric surface. More specifically, it is useful to use an aspheric surface to restrict the F-number at the wide-angle end to a relatively small value and to provide the lenses having a simple lens configuration to the rear lens group LR.

In the first through the third exemplary embodiments, at least one of surfaces of the positive lens included in the third lens unit B3 has an aspheric shape. With this configuration, the first through the third exemplary embodiments can suppress the amount of aberrations occurring in the positive lens to be small.

More specifically, by utilizing the aspheric surface, an aberration reverse to the aberration occurring due to the reference spherical shape of the positive lens is generated. By using the reverse aberration generated by the aspheric surface, the aberration occurring due to the reference spherical shape of the positive lens is appropriately set off.

If the zoom lens according to each exemplary embodiment is applied to an image pickup apparatus including an image sensor, a circuitry unit for electrically correcting at least one of distortion and chromatic aberration of magnification can be used. If a lens configuration capable of electrically tolerating the distortion occurring on the zoom lens is employed, each exemplary embodiment can achieve a small-size zoom lens with a small number of constituent lenses.

By electrically correcting chromatic aberration of magnification, it becomes easy to suppress bleeding of color on a photographed image and to increase the resolution of the photographed image.

In each exemplary embodiment, it is further useful if the ranges of the values in the conditions (1) through (10) are altered as follows:

$$0.70 < (\beta 2T/\beta 2W)/(\beta 3T/\beta 3W) < 1.65 \quad (1a)$$

$$0.05 < |f2|/fT < 0.15 \quad (2a)$$

$$2.7 < \beta 3T/\beta 3W < 4.0 \quad (3a)$$

$$1.54 < nd3i < 1.80 \quad (4a)$$

$$55 < vd3i < 80 \quad (5a)$$

$$0.6 < |m3|/\sqrt{(fW \times fT)} < 1.8 \quad (6a)$$

$$0.6 < f3/\sqrt{(fW \times fT)} < 1.5 \quad (7a)$$

$$0.2 < |f3n|/f3 < 2.7 \quad (8a)$$

$$0.3 < DSP/TDT < 0.7 \quad (9a)$$

$$0.4 < f1/fT < 1.2 \quad (10a).$$

By satisfying the condition (1a), the share of powers assigned to the second lens unit B2 and the third lens unit B3 for variable magnification can become more appropriate. As a result, it becomes easier to suppress variation of curvature of field and coma occurring during zooming.

By satisfying the condition (2a), it becomes easier to appropriately correct curvature of field for the entire zooming range. By satisfying the condition (3a), it becomes easier to achieve a high zoom ratio in a small-size zoom lens.

By satisfying the condition (4a), the lens configuration of the third lens unit B3 can be more simplified while correcting spherical aberration and coma. By satisfying the condition (5a), it becomes easier to further reduce the variation of axial chromatic aberration during zooming.

By satisfying the condition (6a), the amount of movement of the third lens unit B3 during zooming can be more appropriate. In addition, it becomes easier to achieve a high zoom ratio and to suppress coma. By satisfying the condition (7a), the refractive power of the third lens unit B3 can be more appropriately set. As a result, it becomes easier to achieve a high zoom ratio and reduce the lens total length at the telephoto end.

By satisfying the condition (8a), it becomes easier to reduce the lens total length and to correct spherical aberration and coma. By satisfying the condition (9a), the effective diameter of the front lens can be more easily reduced and the aberration of an off-axis light flux can be more easily corrected. Furthermore, by satisfying the condition (10a), it becomes easier to reduce the effective diameter of the front lens end and to correct axial chromatic aberration at the telephoto end.

In each exemplary embodiment, it is yet further useful if the ranges of the values in the conditions (1a) through (10a) are altered as follows:

$$1.00 < (\beta 2T/\beta 2W)/(\beta 3T/\beta 3W) < 1.65 \quad (1b)$$

$$0.10 < |f2|/fT < 0.15 \quad (2b)$$

$$3.0 < \beta 3T/\beta 3W < 4.0 \quad (3b)$$

$$1.55 < nd3i < 1.70 \quad (4b)$$

$$60 < \nu d3i < 80 \quad (5b)$$

$$0.8 < |m3|/\sqrt{(fW \times fT)} < 1.5 \quad (6b)$$

$$0.7 < f3/\sqrt{(fW \times fT)} < 1.0 \quad (7b)$$

$$0.3 < |\beta n|/\beta 3 < 2.4 \quad (8b)$$

$$0.4 < DSP/TDT < 0.6 \quad (9b)$$

$$0.6 < fl/fT < 1.0 \quad (10b).$$

Now, an exemplary embodiment of a camcorder (video camera) that uses the zoom lens according to each exemplary embodiment of the present invention as a photographic optical system will be described below with reference to FIG. 7.

Referring to FIG. 7, the camcorder includes a camera body 10 and a photographic optical system 11. The photographic optical system 11 is constituted by a zoom lens according to any of the above-described first through third exemplary embodiments of the present invention.

In addition, the camera body 10 includes a solid-state image sensor (photoelectrical conversion element) 12, such as a charge-coupled device (CCD) sensor or a complementary metal oxide semiconductor (CMOS) sensor, which is located at the image plane IP of the zoom lens. Furthermore, the solid-state image sensor 12 receives an object image formed by the photographic optical system 11 when light passes through the zoom lens from the object side to the image side. In addition, the camera body 10 includes a viewfinder 13, via which a user of the camcorder can observe an object image formed on the solid-state image sensor 12.

Now, an exemplary embodiment of a digital still camera (image pickup apparatus) that uses a zoom lens according to any exemplary embodiment of the present invention as a photographic optical system will be described below with reference to FIG. 8. FIG. 8 illustrates main components of a digital still camera (image pickup apparatus) that uses the zoom lens according to an exemplary embodiment of the present invention.

Referring to FIG. 8, the digital still camera includes a camera body 20 and a photographic optical system 21, which is constituted by the zoom lens according to any of the above-described exemplary embodiments of the present invention. In addition, the camera body 20 includes a solid-state image sensor (photoelectrical conversion element) 22, such as a CCD sensor or a CMOS sensor. The solid-state image sensor 22 is provided inside the camera body 20. Furthermore, the image sensor 22 receives an object image formed by the photographic optical system 21.

Numerical examples 1 through 3, which respectively correspond to the first through the third exemplary embodiments of the present invention, are set forth below. In each of the numerical examples 1 through 3, "i" (where i=1, 2, 3 . . . ) denotes the order of a surface from the object side to the image side, "ri" denotes a radius of curvature of an i-th optical surface (the i-th lens surface), "di" denotes an axial space between the i-th surface and the (i+1)-th surface, "ndi" and "νdi" respectively denote a refractive index and an Abbe number of the material of the i-th optical member with respect to d-line light. The last two surfaces closest to the image side are equivalent to a glass block G.

When a given surface is an aspheric surface, an asterisk ("*") next to the surface number indicates that this surface is an aspheric surface. In addition, "K" denotes a conic coefficient. Each of "A4", "A6", "A8", and "A10" denotes an aspheric coefficient. The aspheric shape of an aspheric surface is expressed as $$X = (H^2/R))/[1 + \{1-(1+K)(H/R)^2\}^{1/2}] + A4H^4 + A6H^6 + A8H^8 + A10H^{10}$$

where "X" denotes a displacement from a surface vertex along the optical axis at a position at a height "H" from the optical axis, and "R" denotes a paraxial radius of curvature.

The scientific notation "e-x" for each aspheric coefficient is equivalent to the exponential notation "$1 \times 10^{-x}$". "BF" denotes an air-equivalent back focus. The relationship between each condition described above and each numerical example is set forth in Table 1. In each numerical example, values of various data, such as focal length, F-number, angle of view, image height, lens total length, and BF, at four different positions, such as the wide-angle end, the first middle zoom position, the second middle zoom position, and the telephoto end, are set forth.

Numerical Example 1

Unit: mm

Surface Data

| Surface No. | r | d | nd | νd |
|---|---|---|---|---|
| 1 | 44.910 | 1.10 | 1.80518 | 25.4 |
| 2 | 26.922 | 3.02 | 1.49700 | 81.5 |
| 3 | 213.269 | 0.20 | | |
| 4 | 29.723 | 2.42 | 1.69680 | 55.5 |
| 5 | 142.326 | Variable | | |
| 6 | 597.524 | 0.80 | 1.88300 | 40.8 |
| 7 | 6.989 | 2.95 | | |
| 8 | −19.693 | 0.65 | 1.71300 | 53.9 |
| 9 | 27.817 | 1.10 | | |
| 10 | 17.283 | 1.26 | 1.94595 | 18.0 |
| 11 | 100.561 | Variable | | |
| 12(Stop) | ∞ | 1.97 | | |
| 13* | 5.868 | 2.60 | 1.55332 | 71.7 |
| 14* | −22.271 | 1.98 | | |
| 15 | 112.968 | 0.70 | 1.90366 | 31.3 |
| 16 | 4.627 | 0.23 | | |
| 17 | 5.315 | 2.20 | 1.58144 | 40.8 |
| 18 | −599.875 | 0.60 | | |
| 19 | ∞ | Variable | | |
| 20 | 19.791 | 2.12 | 1.80400 | 46.6 |
| 21 | −29.812 | 0.70 | 1.84666 | 23.9 |
| 22 | 113.196 | Variable | | |
| 23 | ∞ | 0.80 | 1.49831 | 65.1 |
| 24 | ∞ | 1.00 | | |
| Image plane | ∞ | | | |

-continued

Unit: mm

Aspheric Coefficients

| | |
|---|---|
| r13 | K = −2.94966e−002 A4 = −2.56243e−004 |
| | A6 = −3.86058e−006 A8 = 5.95265e−007 |
| | A10 = −2.52991e−008 |
| r14 | K = −2.14324e+001 A4 = 1.47358e−004 |
| | A6 = 1.04081e−005 |

Various Data
Zoom Ratio 13.56

| | | | | |
|---|---|---|---|---|
| Focal Length | 5.09 | 7.36 | 42.51 | 69.01 |
| F-number | 3.40 | 3.71 | 5.01 | 6.21 |
| Angle of View | 35.02 | 27.85 | 5.50 | 3.25 |
| Image Height | 3.55 | 3.88 | 3.88 | 3.88 |
| Lens Total Length | 59.51 | 58.11 | 75.78 | 83.01 |
| BF | 6.18 | 8.56 | 14.15 | 4.56 |
| d5 | 0.85 | 3.93 | 24.38 | 27.26 |
| d11 | 20.70 | 14.18 | 2.02 | 2.00 |
| d19 | 5.17 | 4.83 | 8.62 | 22.57 |
| d22 | 4.64 | 7.02 | 12.62 | 3.03 |
| d24 | 1.00 | 1.00 | 1.00 | 1.00 |

Various Data of Each Unit

| Lens unit | First surface | Focal length |
|---|---|---|
| 1 | 1 | 44.24 |
| 2 | 6 | −7.34 |
| 3 | 12 | 14.01 |
| 4 | 20 | 31.01 |
| 5 | 23 | ∞ |

Numerical Example 2

Unit: mm

Surface Data

| Surface No. | r | d | nd | vd |
|---|---|---|---|---|
| 1 | 43.334 | 1.10 | 1.84666 | 23.9 |
| 2 | 27.386 | 2.82 | 1.49700 | 81.5 |
| 3 | 184.015 | 0.20 | | |
| 4 | 28.593 | 2.25 | 1.69680 | 55.5 |
| 5 | 129.921 | Variable | | |
| 6 | 596.413 | 0.80 | 1.83481 | 42.7 |
| 7 | 6.794 | 3.15 | | |
| 8 | −19.052 | 0.65 | 1.69680 | 55.5 |
| 9 | 27.361 | 0.92 | | |
| 10 | 16.564 | 1.26 | 1.94595 | 18.0 |
| 11 | 78.364 | Variable | | |
| 12(Stop) | ∞ | 1.10 | | |
| 13* | 6.249 | 2.60 | 1.55332 | 71.7 |
| 14* | −20.019 | 1.32 | | |
| 15 | 22.644 | 0.70 | 1.80610 | 33.3 |
| 16 | 5.457 | 0.41 | | |
| 17 | 8.162 | 2.20 | 1.48749 | 70.2 |
| 18 | 35.340 | 0.60 | | |
| 19 | ∞ | Variable | | |
| 20 | 18.057 | 2.35 | 1.65844 | 50.9 |
| 21 | −23.293 | 0.80 | 1.84666 | 23.9 |
| 22 | −241.242 | Variable | | |
| 23 | ∞ | 0.80 | 1.51633 | 64.1 |
| 24 | ∞ | 1.00 | | |
| Image plane | ∞ | | | |

Aspheric Coefficients

| | |
|---|---|
| r13 | K = −2.10117e−002 A4 = −3.88986e−004 |
| | A6 = −6.43941e−006 A8 = 4.92457e−007 |
| | A10 = −2.84254e−008 |
| r14 | K = −9.71597e+000 A4 = 6.29353e−005 |
| | A6 = 4.07868e−006 |

Various Data
Zoom Ratio 11.45

| | | | | |
|---|---|---|---|---|
| Focal Length | 5.13 | 7.36 | 38.43 | 58.77 |
| F-number | 3.50 | 3.78 | 5.10 | 5.73 |
| Angle of View | 34.98 | 27.99 | 6.40 | 3.90 |
| Image Height | 3.55 | 3.88 | 3.88 | 3.88 |
| Lens Total Length | 58.20 | 56.74 | 72.70 | 80.10 |
| BF | 6.52 | 8.81 | 15.56 | 10.65 |
| d5 | 0.85 | 3.76 | 22.32 | 25.56 |
| d11 | 20.70 | 14.42 | 2.39 | 1.49 |
| d19 | 4.90 | 4.52 | 7.21 | 17.18 |
| d22 | 4.99 | 7.28 | 14.03 | 9.12 |

Various Data of Each Unit

| Lens unit | First surface | Focal length |
|---|---|---|
| 1 | 1 | 43.47 |
| 2 | 6 | −7.36 |
| 3 | 12 | 13.93 |
| 4 | 20 | 31.17 |
| 5 | 23 | ∞ |

Numerical Example 3

Unit: mm

Surface Data

| Surface No. | r | d | nd | vd |
|---|---|---|---|---|
| 1 | 35.277 | 1.00 | 1.94595 | 18.0 |
| 2 | 23.727 | 2.80 | 1.88300 | 40.8 |
| 3 | 133.434 | Variable | | |
| 4 | 62.920 | 0.60 | 1.85135 | 40.1 |
| 5* | 7.437 | 4.11 | | |
| 6 | −21.883 | 0.60 | 1.51680 | 64.2 |
| 7 | 13.179 | 0.30 | | |
| 8 | 11.709 | 1.93 | 1.94595 | 18.0 |
| 9 | 26.079 | Variable | | |
| 10(Stop) | ∞ | 0.50 | | |
| 11* | 9.984 | 2.10 | 1.59201 | 67.0 |
| 12 | 11.375 | 0.80 | 1.94595 | 18.0 |
| 13 | 7.727 | 3.57 | 1.65844 | 50.9 |
| 14* | −19.364 | Variable | | |
| 15 | 9.476 | 1.40 | 1.92286 | 20.9 |
| 16 | 6.882 | Variable | | |
| 17 | 11.108 | 2.56 | 1.48749 | 70.4 |
| 18 | −589.321 | Variable | | |
| 19 | ∞ | 0.80 | 1.51680 | 64.2 |
| 20 | ∞ | 1.00 | | |
| Image plane | ∞ | | | |

Aspheric Coefficients

| | |
|---|---|
| r5 | K = 1.29368e−001 A4 = −1.88809e−005 |
| | A6 = 4.74092e−007 |
| r11 | K = −2.12053e−001 A4 = −1.33629e−004 |
| | A6 = 2.87874e−007 A8 = −1.88648e−008 |
| r14 | K = −1.10715e+000 A4 = 4.87229e−005 |

Various Data
Zoom Ratio 13.61

| | | | | |
|---|---|---|---|---|
| Focal Length | 4.13 | 5.68 | 19.67 | 56.21 |
| F-number | 2.88 | 3.01 | 4.13 | 6.00 |
| Angle of View | 36.24 | 32.00 | 10.38 | 3.56 |
| Image Height | 3.10 | 3.60 | 3.60 | 3.60 |

-continued

| Unit: mm | | | | |
|---|---|---|---|---|
| Lens Total Length | 61.21 | 54.10 | 65.20 | 87.96 |
| BF | 3.91 | 6.18 | 13.63 | 3.79 |
| d3 | 0.71 | 1.37 | 15.59 | 30.92 |
| d9 | 25.85 | 16.58 | 3.07 | 2.74 |
| d14 | 2.86 | 3.24 | 4.84 | 6.03 |
| d16 | 5.61 | 4.46 | 5.79 | 22.20 |
| d18 | 2.38 | 4.66 | 12.10 | 2.27 |

Various Data of Each Unit

| Lens unit | First surface | Focal length |
|---|---|---|
| 1 | 1 | 55.84 |
| 2 | 4 | −7.94 |
| 3 | 10 | 12.33 |
| 4 | 15 | −36.76 |
| 5 | 17 | 22.40 |
| 6 | 19 | ∞ |

TABLE 1

| | Numerical Example | | |
|---|---|---|---|
| Condition | 1 | 2 | 3 |
| fW | 5.087 | 5.133 | 4.131 |
| fT | 70.308 | 58.772 | 56.214 |
| f1 | 44.239 | 43.468 | 55.835 |
| f2 | −7.339 | −7.359 | −7.945 |
| f3 | 14.010 | 13.935 | 12.328 |
| f4 | 31.006 | 31.166 | −36.757 |
| f5 | — | — | 22.396 |
| β2W | −0.223 | −0.229 | −0.183 |
| β2T | −0.133 | −1.000 | −0.605 |
| β3W | −0.698 | −0.708 | −0.419 |
| β3T | −2.238 | −2.277 | −1.273 |
| β4W | 0.738 | 0.727 | 1.286 |
| β4T | 0.627 | 0.594 | 1.763 |
| β5W | — | — | 0.750 |
| β5T | — | — | 0.457 |
| m3 | −15.784 | −16.409 | −19.645 |
| f3n | −5.356 | −9.085 | −28.516 |
| TDT | 83.007 | 80.103 | 87.956 |
| DSP | 40.238 | 39.915 | 42.952 |
| (4) nd3i | 1.55332 | 1.55332 | 1.59201 |
| (5) vd3i | 71.68 | 71.68 | 67.02 |
| (11) θgF3i | 0.5402 | 0.5402 | 0.5357 |
| fT/fW | 13.820 | 11.449 | 13.609 |
| (1) (β2T/β2W)/(β3T/β3W) | 1.585 | 1.356 | 1.086 |
| (2) |f2|/fT | 0.104 | 0.125 | 0.141 |
| (3) β3T/β3W | 3.205 | 3.124 | 3.041 |
| (6) |m3|/√(fW × fT) | 0.835 | 0.945 | 1.289 |
| (7) f3/√(fW × fT) | 0.741 | 0.802 | 0.809 |
| (8) |f3n|/f3 | 0.382 | 0.652 | 2.313 |
| (9) DSP/TDT | 0.485 | 0.498 | 0.488 |
| (10) f1/fT | 0.629 | 0.740 | 0.993 |

While the present invention has been described with reference to exemplary embodiments, it is to be understood that the invention is not limited to the disclosed exemplary embodiments. For example, an image pickup apparatus that can use the zoom lens may include a digital still camera, a video camera, a television (TV) camera, a monitoring (surveillance) camera, or a silver-halide film camera. The scope of the following claims is to be accorded the broadest interpretation so as to encompass all modifications, equivalent structures, and functions.

This application claims priority from Japanese Patent Application No. 2010-146109 filed Jun. 28, 2010, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a rear lens group including one or more lens units,
   wherein during zooming, the first lens unit moves along a locus convex towards the image side, and the second lens unit and the third lens unit move such that an interval between the first lens unit and the second lens unit becomes larger at a telephoto end than at a wide-angle end and an interval between the second lens unit and the third lens unit becomes smaller at the telephoto end than at the wide-angle end,
   wherein the third lens unit includes a positive lens and a negative lens, and
   wherein, when $\beta 2W$ and $\beta 2T$ are image forming magnifications of the second lens unit at the wide-angle end and at the telephoto end, respectively, $\beta 3W$ and $\beta 3T$ are image forming magnifications of the third lens unit at the wide-angle end and at the telephoto end, respectively, f2 is a focal length of the second lens unit, fT is a focal length of the entire zoom lens at the telephoto end, f3 is a focal length of the third lens unit and fW is a focal length of the entire zoom lens at the wide-angle end, the following conditions are satisfied:

$$0.10 < (\beta 2T/\beta 2W)/(\beta 3T/\beta 3W) < 1.65$$

$$0.01 < |f2|/fT < 0.15,$$

$$0.5 < f3/\sqrt{(fW \times fT)} \leq 0.809.$$

2. The zoom lens according to claim 1, wherein the following condition is satisfied:

$$2.7 < \beta 3T/\beta 3W < 5.0.$$

3. The zoom lens according to claim 1, wherein, when nd3i and vd3i are a refractive index and an Abbe number of a material of at least one positive lens included in the third lens unit, the following conditions are satisfied:

$$1.54 < nd3i < 2.0$$

$$55 < vd3i < 100.$$

4. The zoom lens according to claim 1, wherein, when m3 is an amount of movement of the third lens unit during zooming from the wide-angle end to the telephoto end, the following condition is satisfied:

$$0.5 < |m3|/\sqrt{(fW \times fT)} < 2.0.$$

5. The zoom lens according to claim 1, wherein, when f3n is a focal length of at least one negative lens included in the third lens unit and f3 is a focal length of the third lens unit, the following condition is satisfied:

$$0.1 < |f3n|/f3 < 3.0.$$

6. The zoom lens according to claim 1, further comprising an aperture stop configured to move integrally with the third lens unit during zooming, which is located on the object side of the third lens unit,
   wherein, when TDT is a total length of the zoom lens at the telephoto end and DSP is an air-equivalent distance from the aperture stop to an image plane at the telephoto end, the following condition is satisfied:

$$0.3 < DSP/TDT < 0.8.$$

7. The zoom lens according to claim 1, wherein, when f1 is a focal length of the first lens unit, the following condition is satisfied:

$$0.2 < f1/fT < 1.2.$$

8. The zoom lens according to claim 1, wherein the rear lens group consists of a fourth lens unit having a positive refractive power, and
wherein the fourth lens unit moves during zooming.

9. The zoom lens according to claim 1, wherein the rear lens group consists of a fourth lens unit having a negative refractive power, and a fifth lens unit having a positive refractive power, and
wherein the fourth lens unit and the fifth lens unit move during zooming.

10. An image pickup apparatus comprising:
a zoom lens; and
an image sensor located at an image plane of the zoom lens and configured to receive an image formed by the zoom lens,
wherein the zoom lens comprises, in order from an object side to an image side;
a first lens unit having a positive refractive power;
a second lens unit having a negative refractive power;
a third lens unit having a positive refractive power; and
a rear lens group including one or more lens unit,
wherein during zooming, the first lens unit moves along a locus convex towards the image side, and the second lens unit and the third lens unit move such that in interval between the first lens unit and the second lens unit becomes larger at a telephoto end than at a wide-angle end and an interval between the second lens unit and the third lens unit becomes smaller at the telephoto end than at the wide-angle end,
wherein, the β2W and β2T are image forming magnifications of the second lens unit at the wide-angle end and at the telephoto end, respectively, β3W and β3T are image forming magnifications of the third lens unit at the wide-angle end and at the telephoto end, respectively, f2 id a focal length of the second lens unit, fT is a focal length of the entire zoom lens at the telephoto end, f3 is a focal length of the third lens unit and fW is a focal length of the entire zoom lens at the wide-angle end, the following conditions are satisfied:

$$0.10 < (\beta 2T/\beta 2W)/(\beta 3T/\beta 3W) < 1.65$$

$$0.01 < |f2|/fT < 0.15,$$

$$0.5 < f3/\sqrt{(fW \times fT)} < 0.809.$$

11. A zoom lens comprising, in order from an object side to an image side:
a first lens unit having a positive refractive power;
a second lens unit having a negative refractive power;
a third lens unit having a positive refractive power; and
a rear lens group including one or more lens units,
wherein during zooming, the first lens unit moves along a locus convex towards the image side, and the second lens unit and the third lens unit move such that an interval between the first lens unit and the second lens unit becomes larger at a telephoto end than at a wide-angle end and an interval between the second lens unit and the third lens unit becomes smaller at the telephoto end than at the wide-angle end,
wherein the third lens unit includes a positive lens and a negative lens, and wherein, when β2W and β2T are image forming magnifications of the second lens unit at the wide-angle end and at the telephoto end, respectively, β3W and β3T are image forming magnifications of the third lens unit at the wide-angle end and at the telephoto end, respectively, f2 is a focal length of the second lens unit, fT is a focal length of the entire zoom lens at the telephoto end, and nd3i and vd3i are a refractive index and an Abbe number of a material of at least one positive lens included in the third lens unit, the following conditions are satisfied:

$$0.10 < (\beta 2T/\beta 2W)/(\beta 3T/\beta 3W) < 1.65$$

$$0.01 < |f2|/fT < 0.15$$

$$1.54 < nd3i < 2.0$$

$$55 < vd3i < 100.$$

12. An image pickup apparatus comprising:
a zoom lens; and
an image sensor located at an image plane of the zoom lens and configured to receive an image formed by the zoom lens,
wherein the zoom lens comprises, in order from an object side to an image side;
a first lens unit having a positive refractive power;
a second lens unit having a negative refractive power;
a third lens unit having a positive refractive power; and
a rear lens group including one or more lens unit,
wherein during zooming, the first lens unit moves along a locus convex towards the image side, and the second lens unit and the third lens unit move such that in interval between the first lens unit and the second lens unit becomes larger at a telephoto end than at a wide-angle end and an interval between the second lens unit and the third lens unit becomes smaller at the telephoto end than at the wide-angle end,
wherein the third lens unit includes a positive lens and a negative lens, and
wherein, when β2W and β2T are image forming magnifications of the second lens unit at the wide-angle end and at the telephoto end, respectively, β3W and β3T are image forming magnifications of the third lens unit at the wide-angle end and at the telephoto end, respectively, f2 is a focal length of the second lens unit, fT is a focal length of the entire zoom lens at the telephoto end, and nd3i and vd3i are a refractive index and an Abbe number of a material of at least one positive lens included in the third lens unit, the following conditions are satisfied:

$$0.10 < (\beta 2T/\beta 2W)/(\beta 3T/\beta 3W) < 1.65$$

$$0.01 < |f2|/fT < 0.15$$

$$1.54 < nd3i < 2.0$$

$$55 < vd3i < 100.$$

13. A zoom lens comprising, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein during zooming, the first lens unit moves along a locus convex towards the image side, and the second lens unit and the third lens unit move such that an interval between the first lens unit and the second lens unit becomes larger at a telephoto end than at a wide-angle end and an interval between the second lens unit and the third lens unit becomes smaller at the telephoto end than at the wide-angle end, and the fourth lens unit and the fifth lens unit move, wherein the third lens unit includes a positive lens and a negative lens, and wherein, when β2W and β2T are image forming magnifications of the second lens unit at the wide-angle end and at the telephoto end, respectively, β3W and β3T are image forming magnifications of the third lens unit at the wide-angle end and at the telephoto end, respectively, f2 is a focal length of the second lens unit, and fT is a focal length of the entire zoom lens at the telephoto end, the following conditions are satisfied:

0.10<(β2T/β2W)/(β3T/β3W)<1.65

0.01<|f2|/fT<0.15.

14. An image pickup apparatus comprising:
a zoom lens; and
an image sensor located at an image plane of the zoom lens and configured to receive an image formed by the zoom lens,
wherein the zoom lens comprises, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein during zooming, the first lens unit moves along a locus convex towards the image side, and the second lens unit and the third lens unit move such that an interval between the first lens unit and the second lens unit becomes larger at a telephoto end than at a wide-angle end and an interval between the second lens unit and the third lens unit becomes smaller at the telephoto end than at the wide-angle end, and the fourth lens unit and the fifth lens unit move, wherein the third lens unit includes a positive lens and a negative lens, and wherein, when β2W and β2T are image forming magnifications of the second lens unit at the wide-angle end and at the telephoto end, respectively, β3W and β3T are image forming magnifications of the third lens unit at the wide-angle end and at the telephoto end, respectively, f2 is a focal length of the second lens unit, and fT is a focal length of the entire zoom lens at the telephoto end, the following conditions are satisfied:

0.10<(β2T/β2W)/(β3T/β3W)<1.65

0.01<|f2|/fT<0.15.

* * * * *